April 3, 1951          C. M. SKINNER          2,547,670
PROFILING MACHINE
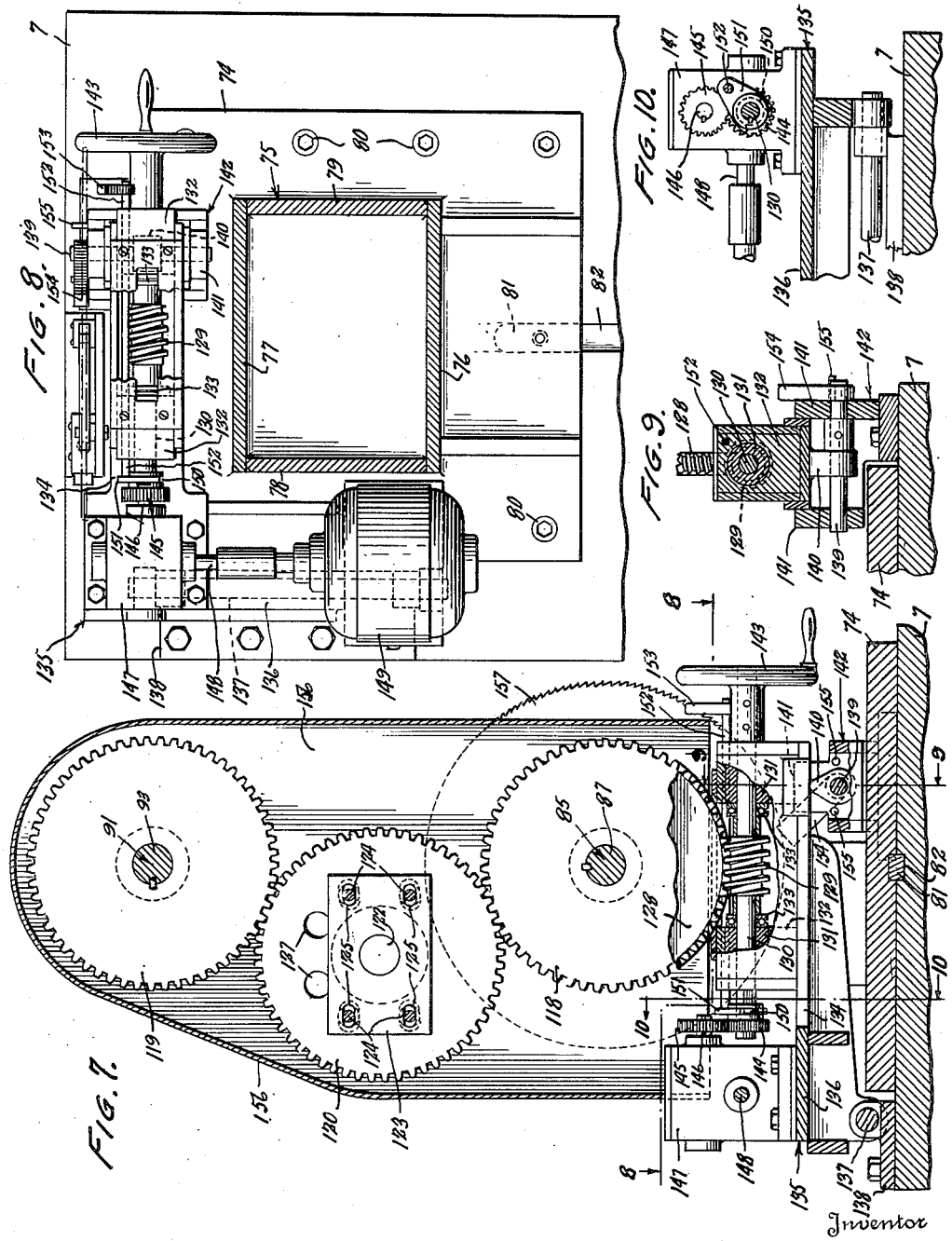
Inventor
CLAUDE M. SKINNER
By Semmes, Keegin, Beale & Semmes
Attorneys April 3, 1951        C. M. SKINNER        2,547,670
PROFILING MACHINE
Filed Aug. 23, 1944        12 Sheets-Sheet 6
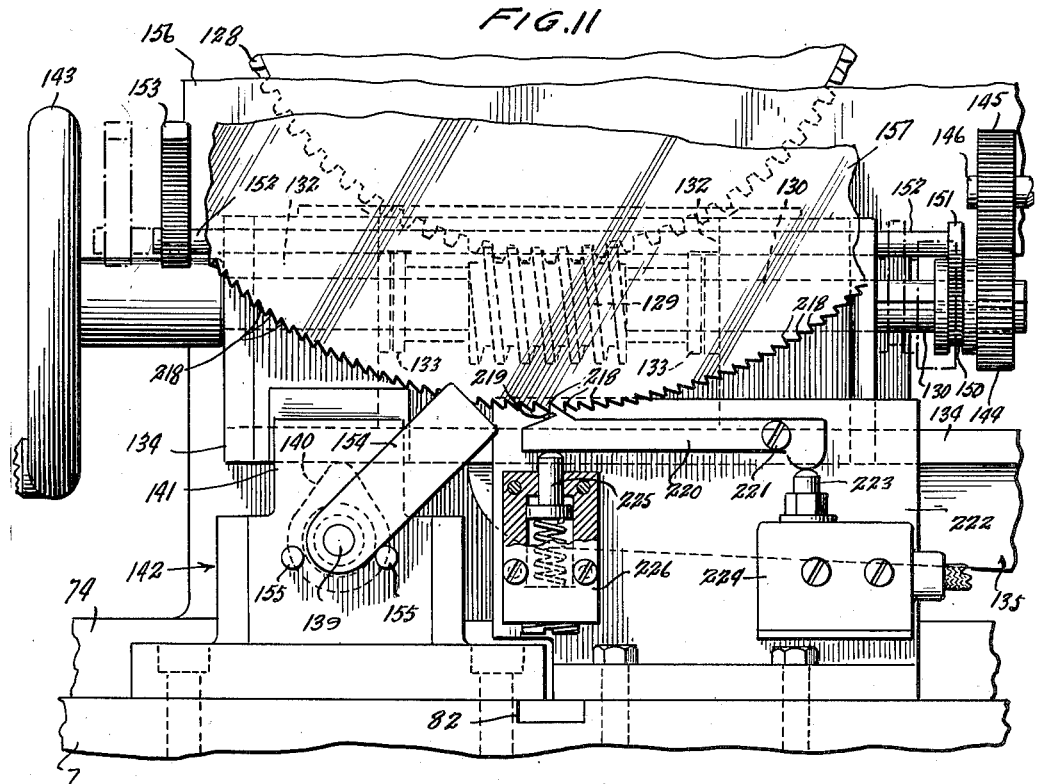
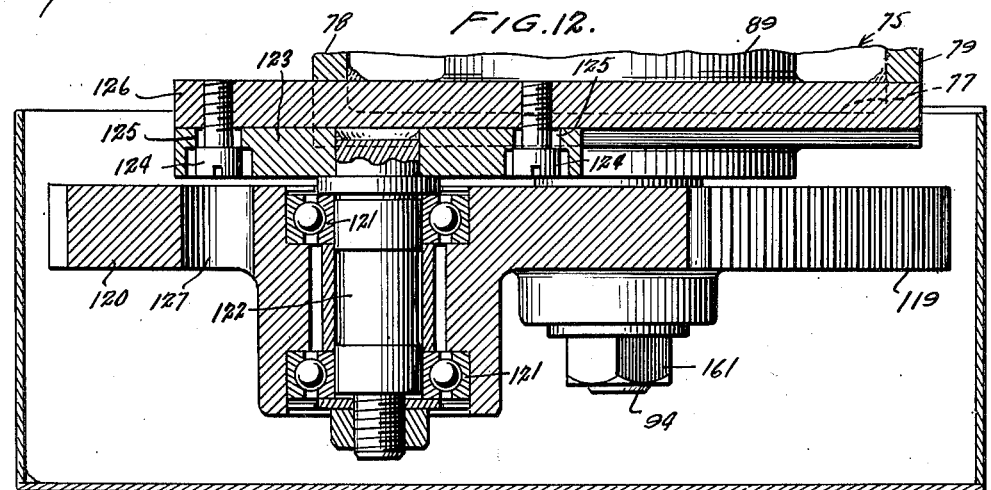
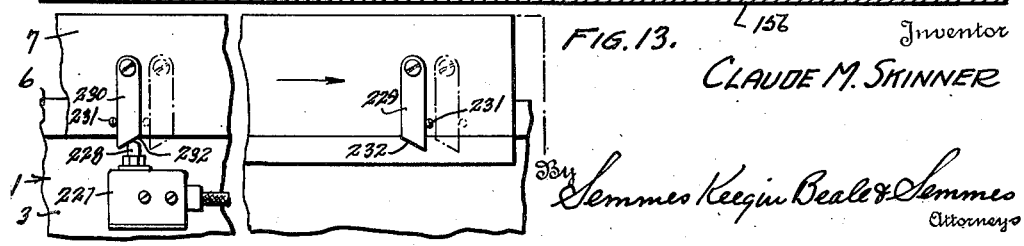
Inventor
CLAUDE M. SKINNER
By Semmes Keegin Beale & Semmes
Attorneys April 3, 1951
C. M. SKINNER
2,547,670
PROFILING MACHINE
Filed Aug. 23, 1944
12 Sheets-Sheet 7
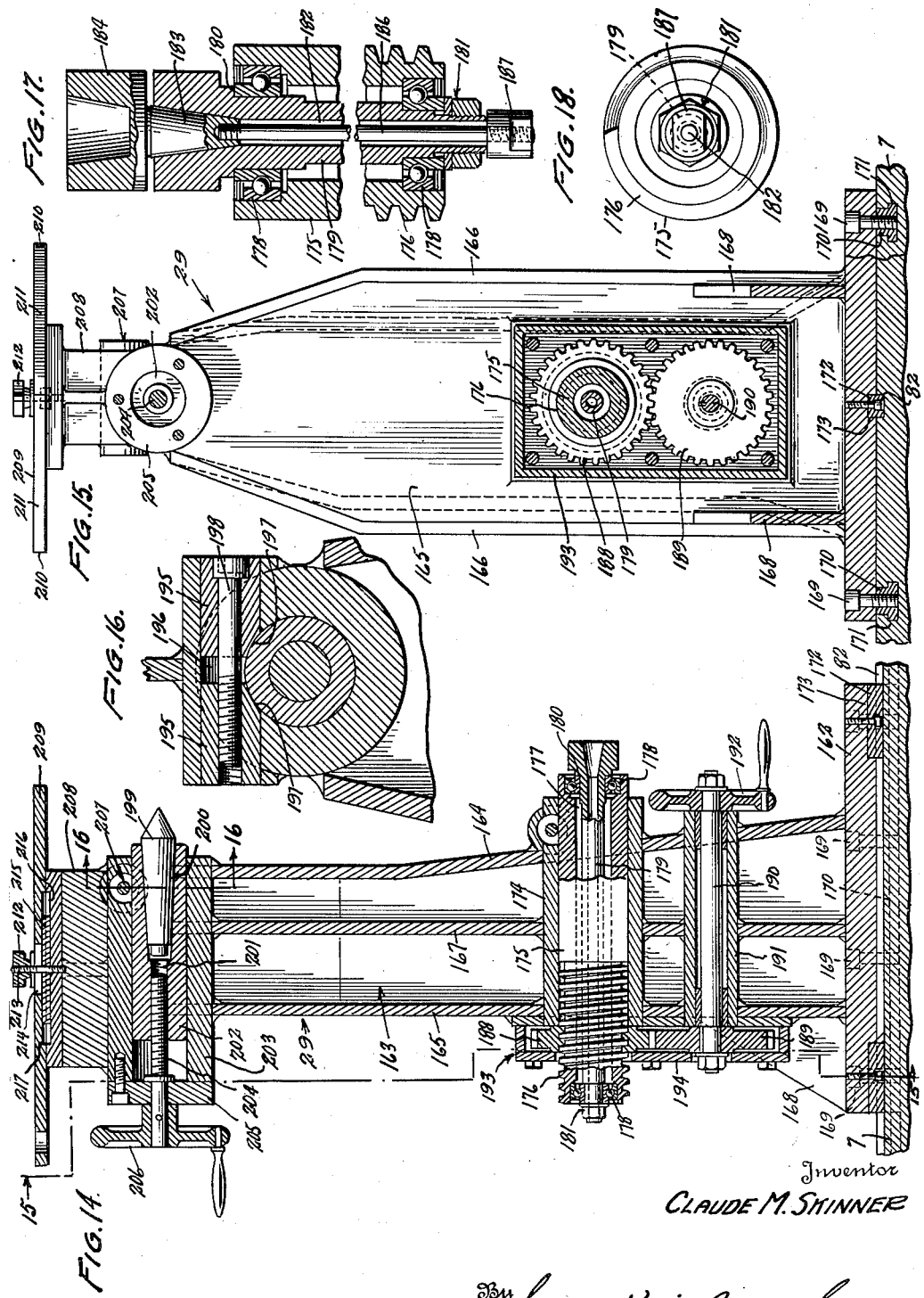
Inventor
CLAUDE M. SKINNER
By Semmes, Keegin, Beale & Semmes
Attorneys April 3, 1951  C. M. SKINNER  2,547,670
PROFILING MACHINE
Filed Aug. 23, 1944  12 Sheets-Sheet 8
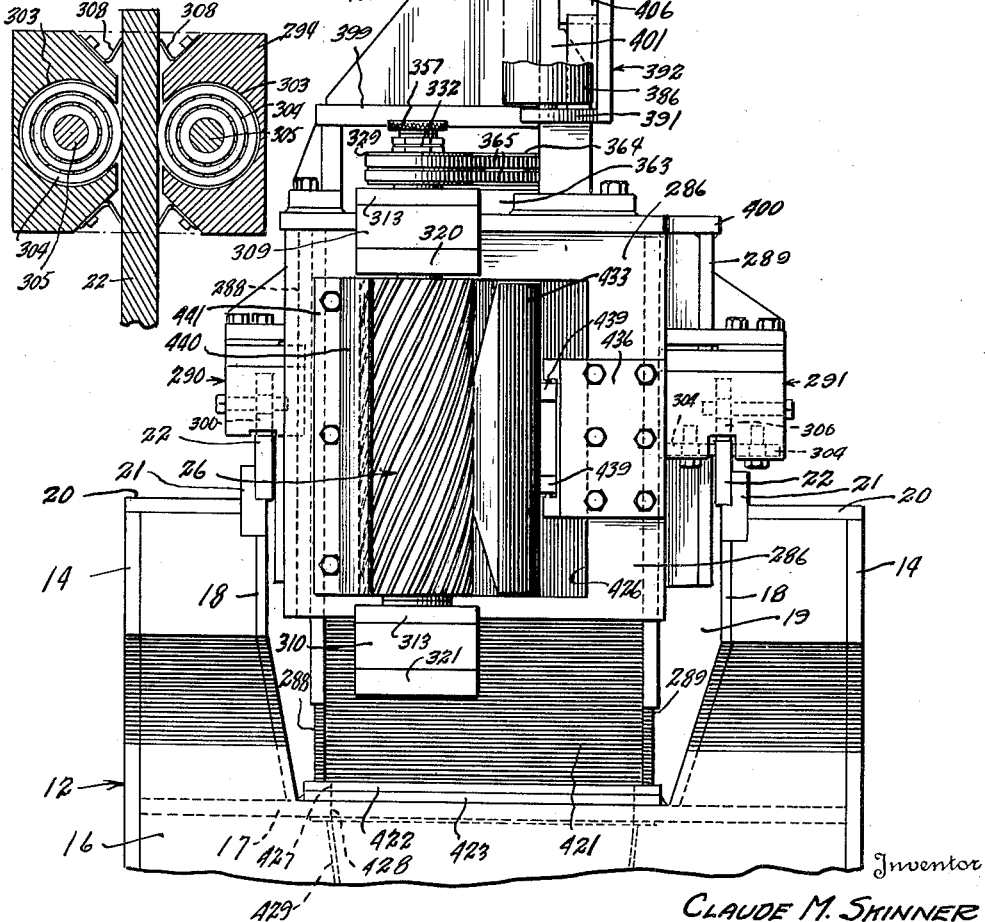
Inventor
CLAUDE M. SKINNER
By Semmes, Keegin, Beale & Semmes
Attorneys April 3, 1951 C. M. SKINNER 2,547,670
PROFILING MACHINE
Filed Aug. 23, 1944 12 Sheets-Sheet 9
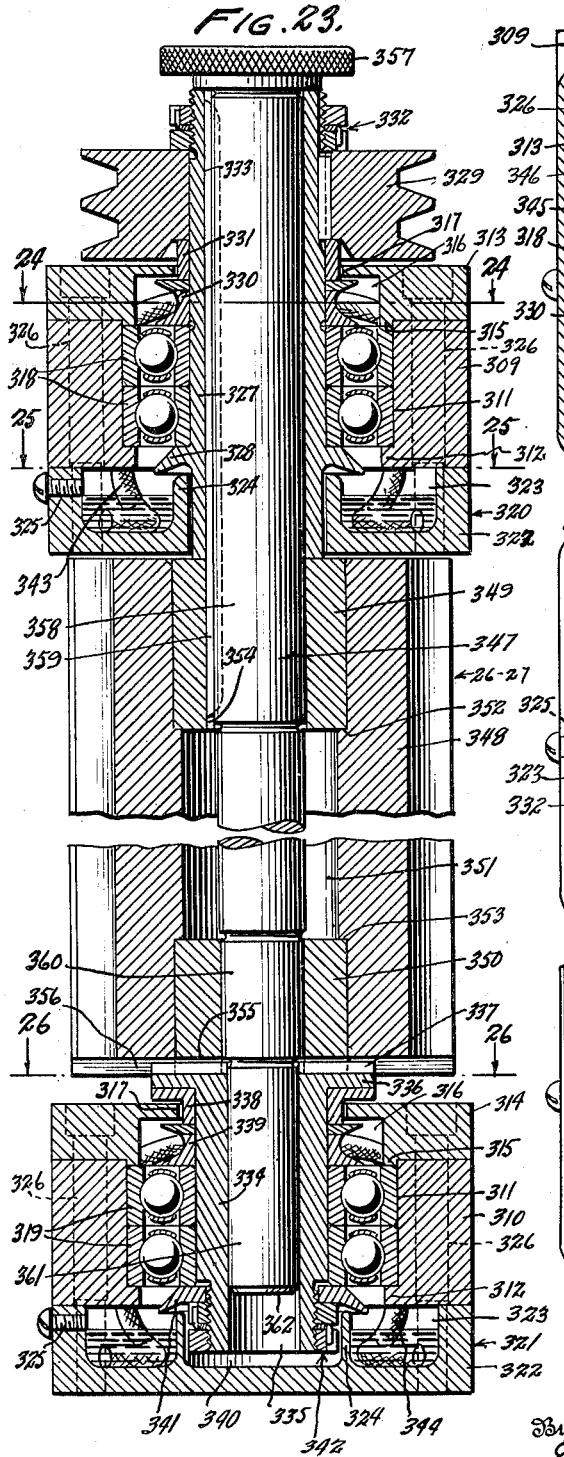
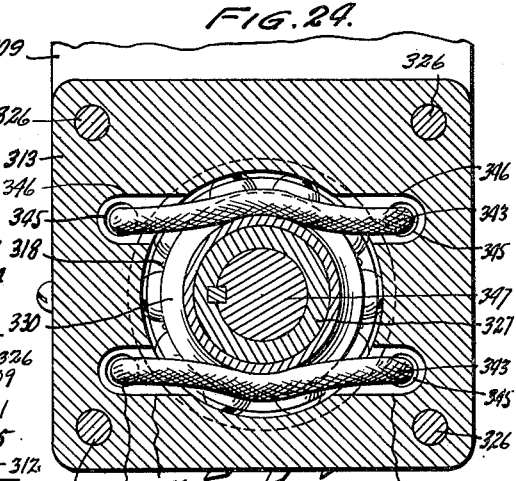
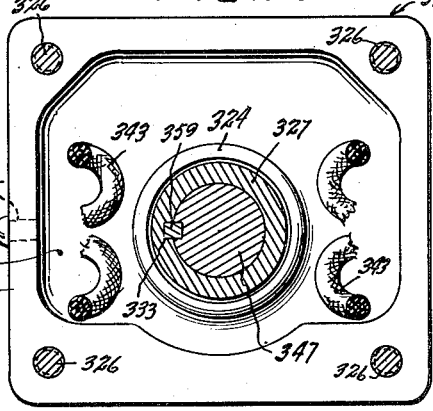
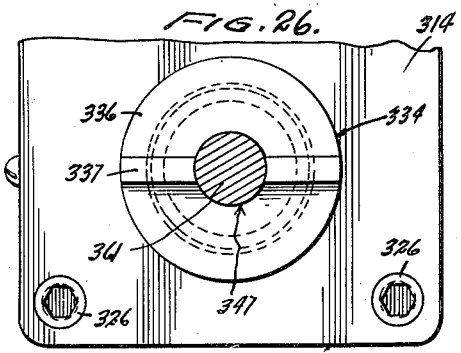
Inventor
CLAUDE M. SKINNER
By Semmes, Keegin, Beale & Semmes
Attorneys April 3, 1951 C. M. SKINNER 2,547,670
PROFILING MACHINE
Filed Aug. 23, 1944 12 Sheets-Sheet 10
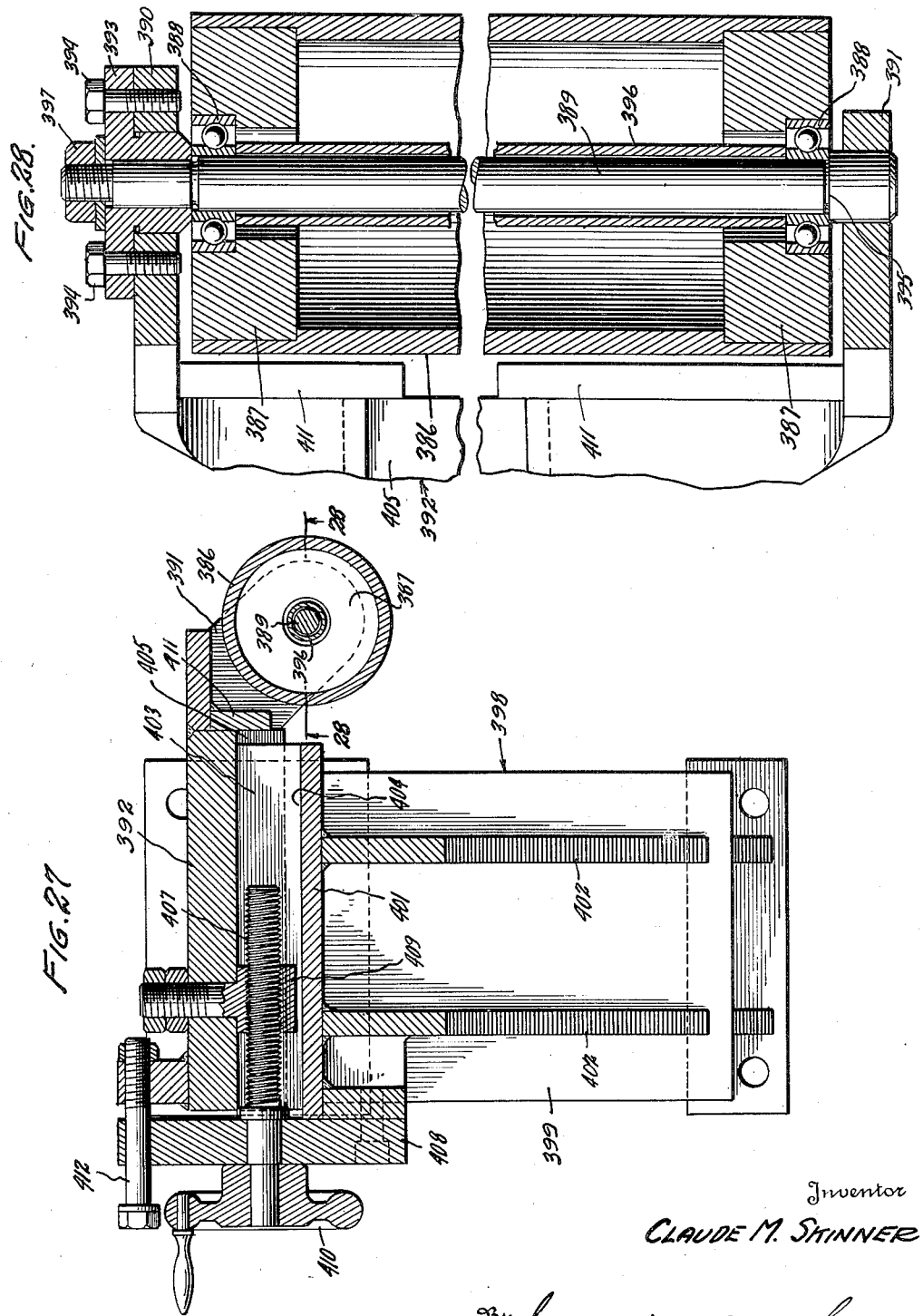
Inventor
CLAUDE M. SKINNER
By Semmes, Keegin, Beale & Semmes
Attorneys

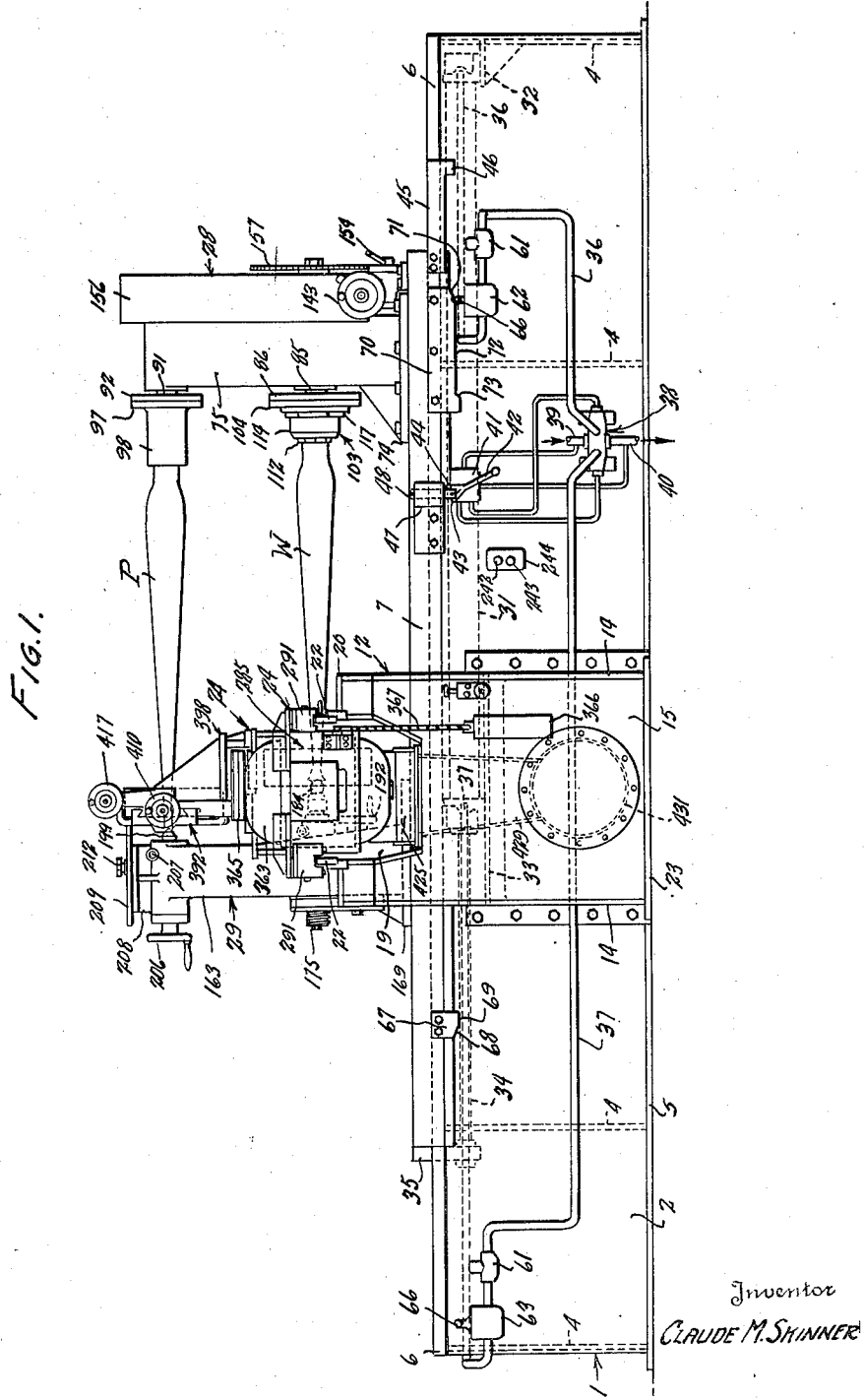

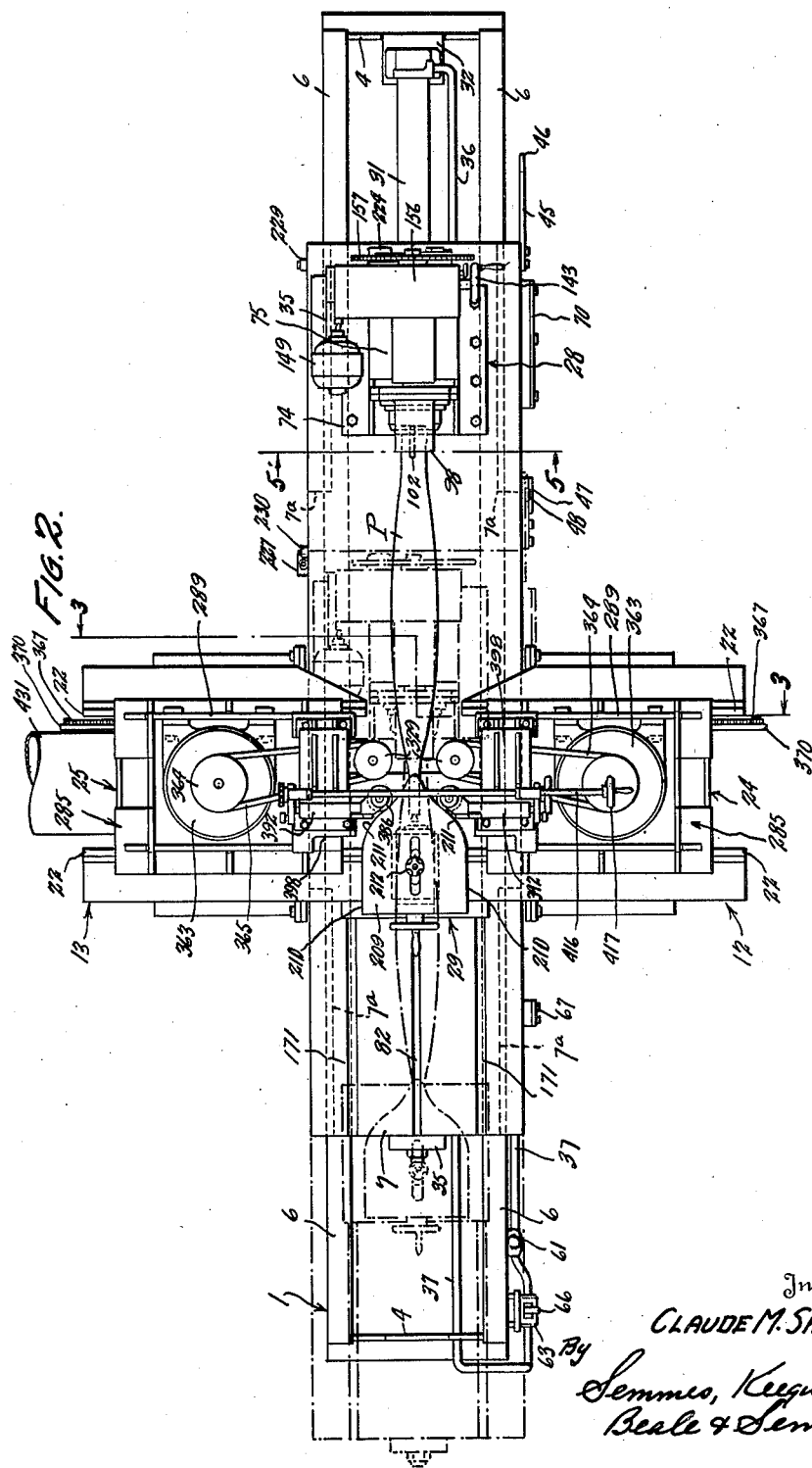

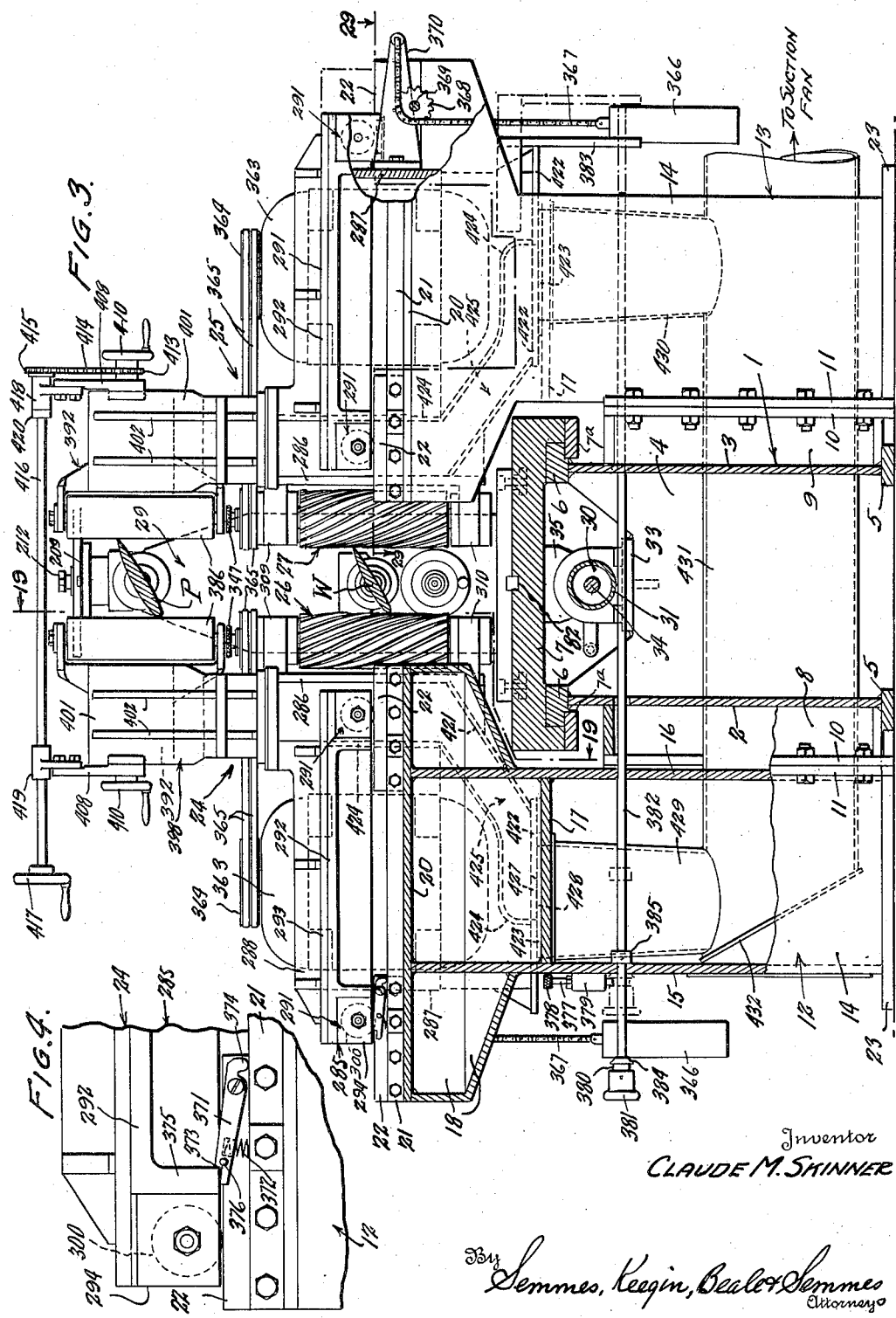

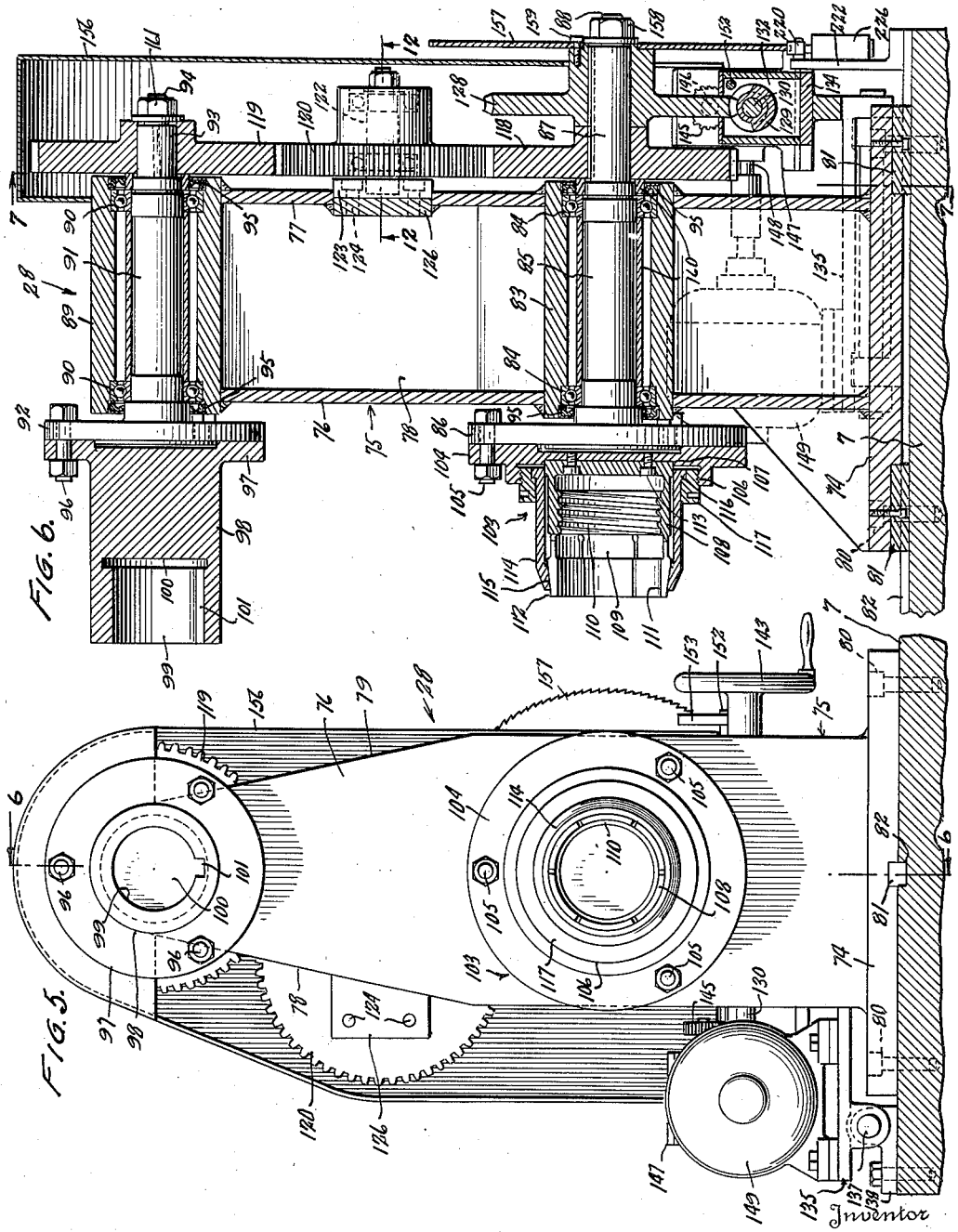

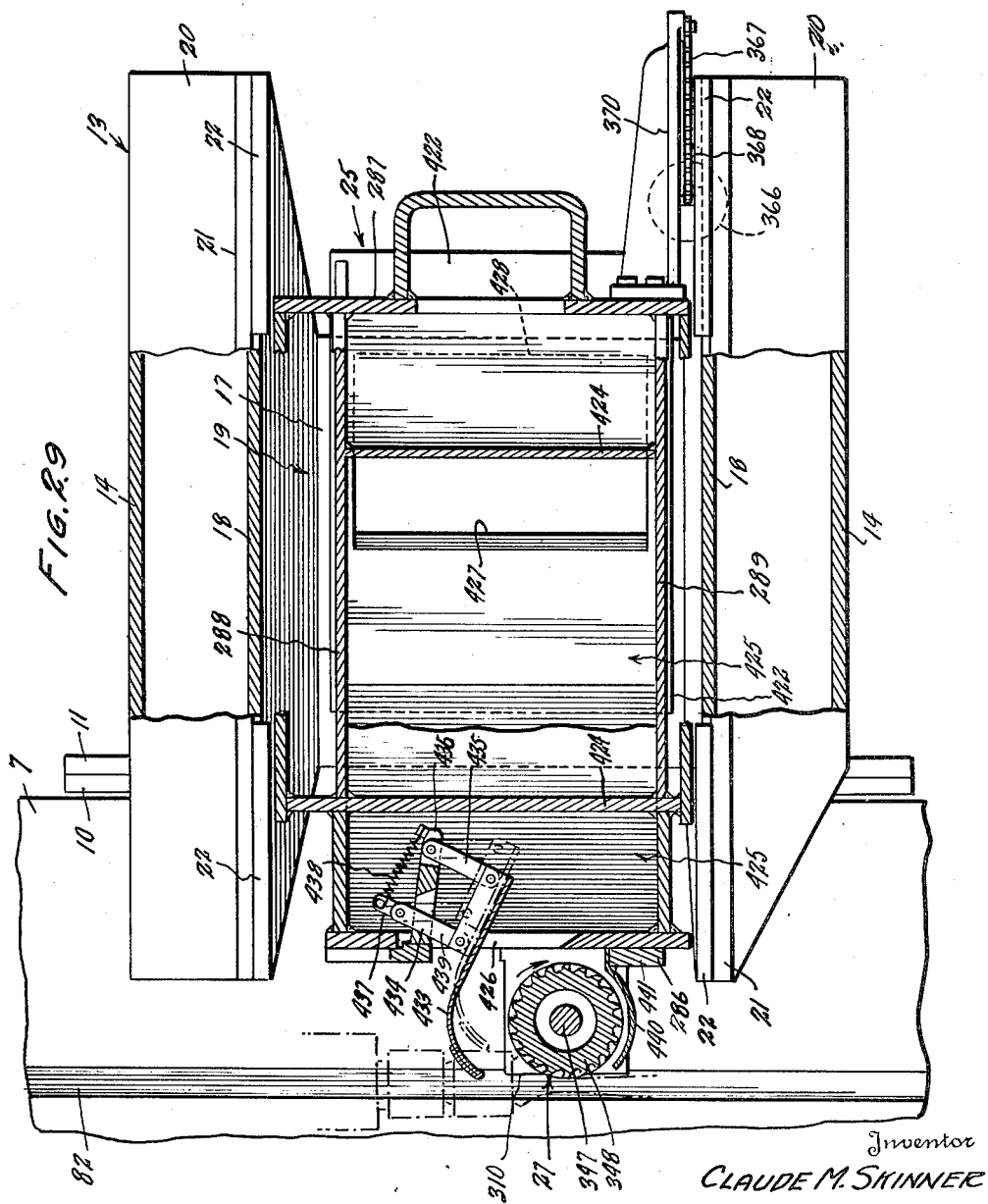

April 3, 1951  C. M. SKINNER  2,547,670
PROFILING MACHINE

Filed Aug. 23, 1944  12 Sheets-Sheet 12

Inventor
CLAUD M. SKINNER
By
Semmes, Keegin, Beale & Semmes
Attorneys

Patented Apr. 3, 1951

2,547,670

UNITED STATES PATENT OFFICE 2,547,670

PROFILING MACHINE

Claude M. Skinner, Ellicott City, Md., assignor to Koppers Company, Inc., doing business as Bartlett Hayward Division, Baltimore, Md., a corporation of Delaware Application August 23, 1944, Serial No. 550,795

20 Claims. (Cl. 90—13.4)

This invention relation relates to machine tools and more particularly to an automatic machine tool for profiling propeller blades for aircraft from a work blank thereof, material being removed from the blank by a cutting tool in accordance with a master model of the blade.

Solid propeller blades, whether made of wood, plastics, or metal present certain advantages over the hollow types built up from formed sheet material. These solid blades are machines from work blanks, aluminum alloy forgings being extensively used, and with recent developments in plastic bonding materials, blades shaped from laminated wood blanks are again coming into use. Because of the limitations of available machine tools, however, a great amount of hand work has heretofore been necessary to correctly shape these solid blades.

Today the great majority of aircraft propellers are made with detachable blades carried by a separate hub, and in the manufacture of blades for such propellers it is highly important that all blades for a given design and horsepower be made exactly alike in order that when a blade in the assembly is replaced with a new one, the new blade will exactly match the others. This is especially important in propellers of the so-called constant speed type. Propeller blades must present an absolutely smooth surface, and in production, it is highly desirable that the machining operation produce, as nearly as possible, the finished surface of the blade to eliminate lengthy and tedious hand finishing operations.

Various machines have heretofore been proposed for automatically machining propeller blades to required shape but these machines have for the most part been mere adaptations of usual profiling tools and do not take into consideration all of the problems involved in propeller manufacture. Chief among these problems is the precision necessary for accurate reproduction of the blades. This precision may only be obtained by vibrationless operation of the machine, both in the cutter operation and feed and also in the work feed. In shaping wooden blades particularly, a high cutter speed devoid of vibration is necessary.

It is therefore one of the principal objects of this invention to provide a machine for automatically reproducing propeller blades in which the optimum in rigidity and vibrationless operation is obtained.

Another object of the invention is to provide an automatically operated machine for shaping propeller blades which will substantially finish the blade without removal from the machine.

Yet another object of the invention is to provide a machine of the above character which is fully adjustable in the speed and amount of work feed, depth of cut, and fully adjustable for producing blades of different lengths.

Still another object is to provide a machine for shaping propeller blades in which the work is moved in reciprocating motion with respect to a rotary tool which is fed transversely with respect to the work in accordance with a model or pattern of the blade to be formed, and in which the work and model pattern are rigidly held during the cutting feed strokes and simultaneously indexed about their axes at the end of the cutting strokes.

This invention also has as an object to provide a machine of the above character employing opposed cutting tools operating on opposite sides of the work and which has both manual and automatic means for moving the tools out of engagement with the work.

A further object of the invention is to provide a machine of the above character in which the work indexing mechanism and one tool may be rendered inoperative to shape the twist of the flat blade face.

A still further object is to provide a lock-in, lock-out electrical control for automatically indexing the work whereby indexing is effected only at proper times and prevented at other times.

Among the objects of this invention is to provide an automatically reversible reciprocating work feed for the above type mechanism in which the feed stroke is gradually slowed down toward the end of the stroke and gradually accelerated at the beginning of the return stroke to prevent the vibration normally caused by reversing the stroke, and in which the length and speed of the feed stroke are easily and accurately regulated.

It is also an object of this invention to provide a work feed which operates against a back pressure to provide for steady vibrationless feed of the work.

An additional object of the invention is to provide a machine tool of the character mentioned in the preceding objects in which the work axis is positioned close to the machine bed and in which the cutting tool, model or pattern follower and driving motor are a unit movable on ways in the plane of the work axis, with the cutter extending equidistant above and below its ways and work axis.

Another of the many objects of this invention is to provide an automatic tool of this type with adequate and efficient bearings, both rotational and sliding, adequate and efficient ways, efficient and accurate chucks and centers and an efficient system of chip collection and removal.

With these and other objects in view, which may be incident to my improvements, the invention consists in the procedural steps and the parts and combinations to be hereinafter set forth and claimed, with the understanding that the order of operations and the several necessary elements comprising my invention may be varied in construction, proportions and arrangements, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 1 is a side elevational view of the propeller profiling machine made in accordance with this invention.

Figure 2 is a plan view thereof.

Figure 3 is a transverse sectional view taken along the line 3—3 of Figure 2, looking in the direction of the arrows.

Figure 4 is a detailed elevational view of one of the cutter carriage lock-out latches and its associated parts, showing a fragment of the cutter carriages in locked-out position.

Figure 5 is a transverse cross-sectional view taken along the line 5—5 of Figure 2, showing the head stock in elevation.

Figure 6 is a vertical sectional view taken on the line 6—6 of Figure 5, looking in the direction of the arrows.

Figure 7 is a vertical transverse sectional view taken on the line 7—7 of Figure 6, looking in the direction of the arrows.

Figure 8 is a horizontal sectional view taken on the line 8—8 of Figure 7, looking in the direction of the arrows.

Figure 9 is a detailed sectional view taken on the line 9—9 of Figure 7, looking in the direction of the arrows.

Figure 10 is a detailed sectional view taken on the line 10—10 of Figure 7, looking in the direction of the arrows.

Figure 11 is a fragmental elevational view, partly broken away, of the headstock, illustrating a part of the indexing mechanism.

Figure 12 is a horizontal sectional view taken along the line 12—12 of Figure 6, looking in the direction of the arrows.

Figure 13 is a fragmental elevational view showing the indexing motor starting switch and its operating mechanism.

Figure 14 is a vertical longitudinal sectional view of the tail stock.

Figure 15 is a transverse sectional view taken along the line 15—15 of Figure 14, looking in the direction of the arrows.

Figure 16 is a cross sectional view taken on the line 16—16 of Figure 14, looking in the direction of the arrows.

Figure 17 is a longitudinal sectional view of the tail stock work center spindle, partly broken away, showing one form of center therein.

Figure 18 is an end view of the spindle shown in Figure 17, but illustrating a different form of center.

Figure 19 is an elevational view of one of the cutter carriages and its associated bed, taken substantially along the line 19—19 of Figure 3.

Figure 20 is a detailed sectional view of one of the cutter carriage supporting roller mechanisms.

Figure 21 is a sectional view taken along the line 21—21 of Figure 20.

Figure 22 is a sectional view taken along the line 22—22 of Figure 20.

Figure 23 is a longitudinal sectional view partly broken away, of one of the cutters and its associated spindle and bearing mechanisms.

Figure 24 is a cross sectional view taken along the line 24—24 of Figure 23.

Figure 25 is a similar view taken along the line 25—25 of Figure 23.

Figure 26 is a cross sectional view taken along the line 26—26 of Figure 23.

Figure 27 is a horizontal cross sectional view taken on the line 27—27 of Figure 19.

Figure 28 is a vertical transverse sectional view taken on the line 28—28 of Figure 27, showing the construction of one of the model follower rolls.

Figure 29 is a horizontal sectional view taken on the line 29—29 of Figure 3.

Figure 30:
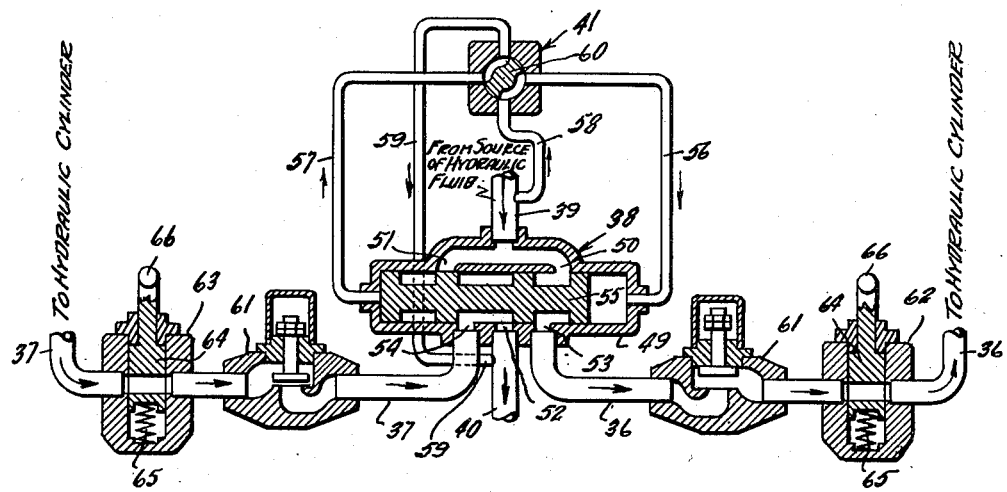
Figure 30 is a diagrammatic view illustrating the hydraulic control for the work table feed.

The machine according to this invention is adapted to move simultaneously the work or blade blank to be machined and a pattern or model of the propeller blade in reciprocating feed strokes longitudinally of the axis of the work, and to index or rotate the work and model simultaneously through a predetermined arc about their axes at the end of each reciprocating stroke. During the longitudinal feed strokes, material is removed from the work by either one or both of a pair of opposed rotary cutting tools movable transversely of the path of movement of the work and controlled by the configuration of the model.

An important feature of the machine is its smooth, vibrationless operation brought about by the rigid construction of the machine and the weight of the work and tool supports, and also by the work feed itself, which operates at all times against a slight back pressure and which is slowed down as the feed is reversed. The work feed and indexing and cutter profiling movements are fully automatic, providing, however, for manual adjustments and operations where necessary and desired, and is capable of producing a substantially finished blade, with the exception of the tip, in a single set-up of the machine.

The basic machine

While the several parts and their cooperational relationships will be described in detail later in this specification, the machine comprises, essentially, an elongated bed supporting longitudinal ways on which is mounted a reciprocably movable table carrying, adjacent opposite ends thereof, a headstock and a tailstock. The headstock is provided with a pair of superposed, parallel spindles, each provided with a chuck, the lower of which is adapted to hold the shank end of the blade pattern or model above referred to. The tailstock is provided with a pair of centers which are axially aligned with the headstock spindles and are adapted to support respectively the tip end of the blank and model. The headstock also carries mechanism for simultaneously indexing the blank and model, either automatically, by movement of the table, or manually if desired.

The reciprocating work feed is preferably hydraulic, employing a cylinder attached to the bed and a piston operatively connected with the table. The fluid is admitted alternately to opposite ends of the cylinder, against a constant back pressure therein, by a reversing valve controlled either automatically by movement of the table, or manually. The fluid flow is also automatically controlled to slow down the table movement prior to reversing.

The machine employs a pair of opposed cutting tools, each of which are journalled in a cutter carriage adapted to roll transversely to the path of the work feed on tracks aligned on opposite sides of the bed. Each carriage is movable independently of the other, being normally urged toward the work and having its inward movement limited by the engagement with the blade pattern or model, of a follower roll which may be adjusted laterally with respect to the cutter to thereby govern the depth of cut made by the tool. Each carriage likewise carries a motor for driving the cutter, and chip shields and ducts which register with a common chip discharging duct extending beneath the carriages and machine bed. Provision is made for moving either or both carriages outwardly away from the work and latching them in this inoperative position. This may be done manually and, in addition, automatic means are provided in the form of a cam carried by the tailstocks and cooperating with the follower rolls to move the carriages outwardly so that the cutters will clear the tailstock when the table is moved to the end of the ways for loading the machine.

All of the controls for operation and adjustment of the machine are arranged to be readily accessible to the operator from one side of the machine.

*The machine bed, table and hydraulic feed*

As best seen in Figures 1, 2 and 3, the machine bed 1 is of elongated construction consisting of a pair of parallel vertical side plates 2 and 3 joined together at their ends and at intervals of their length by web pieces or cross plates 4 which are secured at their vertical edges to the inner faces of the side plates, preferably by welding. The upper edges of the cross plates 4 are cut away in the form of a flat bottom V to provide a through space for the hydraulic feed mechanism to be described later. Surrounding the base of the bed 1 is a flange strip 5, by means of which the bed may be secured to the floor, while secured to the upper edge of each side plate are strips 6 which constitute ways for a table 7. The strips 6 are finished with perfectly flat and parallel upper and lower surfaces, and with the outer edge of one perfectly parallel with the outer edge of the opposite way.

Aligned on opposite sides of the bed 1, substantially intermediate its length, are a pair of rectangular lateral extensions 8 and 9 which are rigidly secured respectively to the outer face of the side plates 2 and 3 and provided on their free vertical edges with flanges 10. Bolted respectively to the flanges 10 of each of the extensions 8 and 9 are flanges 11 provided on left and right (as seen in Figure 3) cutter stands respectively designated generally as 12 and 13. Each of the stands 12 and 13 are of similar construction, except that they are made for positions on the left and right of the machine.

These stands are of box construction, preferably being built up of welded steel plates to provide a rigid structure and comprise T-shaped end plates 14 which extend vertically above the ways 6 with the horizontal portion of the T extending laterally over the ways with enough clearance to permit passage thereunder of the table 7, as shown in Figure 3. Front and back plates 15 and 16 are secured between the end plates 14 and are bifurcated at their upper ends. Secured to the bottom of the bifurcations are horizontal plates 17, which with plates 18 attached to the inner edges of the bifurcations and extending the length of the end plates 14 form troughs 19 which extend transversely of the bed 1.

Connecting the upper edges of the end plates 14 and the sides 18 of the trough are top strips 20 to which, at the inner edges of the trough 19, are welded parallel rail members 21 which are rabbeted along their facing upper edges. Into these rabbets are secured, preferably by bolting at each end of the rails 21, a hardened track piece 22, whose upper surfaces all lie in a horizontal plane which substantially intersects the axis of the work as shown in Figures 1 and 3. The bottom edges of the stands 12 and 13 are provided with a flange 23 for securing the stands to the floor. The stands 12 and 13 each carry for rolling movements on the tracks 22 transversely of the ways 6, opposed cutter heads designated generally as 24 and 25, supporting opposed cutting tools 26 and 27 respectively.

The table 7 is preferably machined from cast iron, rectangular and sufficiently long to support work of the maximum length between a headstock 28 and a tailstock 29 mounted thereon. It is finished with a perfectly flat upper face and slide surfaces on its lower face for accurately engaging the upper and outer side surfaces of the ways 6. The table may be held on the ways 6 by gibs 7a secured to the longitudinal edges of the table, at opposite ends thereof, and engaging the lower, overhanging faces of the ways. The headstock 28 is fixedly secured to the table while provision is made for adjusting the tailstock longitudinally along the table, as will be subsequently more fully set forth, to adapt the machine for blades of different length.

The table 7 reciprocates longitudinally along the ways 6, and, as stated above, preferably is hydraulically operated by the controlled action of fluid pressure on opposite sides of a piston 30 operating in a hydraulic cylinder 31. The cylinder 31 extends through the V cutouts of the cross plates 4 and is attached at its head and rod ends respectively to shelves 32 and 33 provided therefor and secured to the cross plates 4 adjacent the bottom of the V cutouts. The piston rod 34 has its free end attached to a depending ear piece 35 rigidly secured to the far end (with respect to the piston) of the table.

Communicating respectively with opposite ends of the cylinder 31 are fluid lines 36 and 37 which extend therefrom to the operator's side of the machine (the near side as viewed in Figure 1), run parallel with the bed and connect with a reversing valve, designated generally as 38, attached to the bed side plate 2. Also connecting with the valve 38 is a supply line 39, which connects with a fluid pump (not shown), and an exhaust line 40 for returning fluid to its storage supply (also not shown). Any suitable means for supplying fluid under pressure, and at a controllable volume to the cylinder 31, may be employed, but a rotary variable displacement pump of high speed, multiplunger type is preferred as this type apparatus can be accurately and easily controlled to provide a wide range of steady feeds for the table.

The reversing valve 38 is preferably hydraulically actuated by a 4-way pilot valve 41 affixed to the bed side plate 2 just below the edge of the table 7 and equipped with an operating lever 42 provided with a leftwardly projecting lug 43 and a rightwardly projecting lug 44. Secured to the edge of the table 7 is an extension 45 having a downwardly projecting end or dog 46 which is positioned in fixed relationship to the headstock 25 and adapted, when the table moves to the left (as viewed in Figure 1) to engage the leftwardly projecting lug 43 and move the lever 42 in a counter-clockwise direction and reverse the table movement when the cutting tools engage the shank end of the blade blank. Also secured to the edge of the table is a slide 47 which carries, for vertical movement therein, a second dog 48. This last dog is displaced laterally outward somewhat from the dog 46 (see Figure 2) so that it will clear the leftwardly projecting lug 43 of the lever 42 but will engage the rightwardly projecting lug 44 to rock the lever clockwise when the table 7 moves to the right hand end of its stroke.

The position of the dog 46 on the table 7 is fixed since the position of the head stock, which holds the shank of the blade blank, is fixed on the table. The machine, as set forth, however, is capable of performing on blades of different lengths by adjusting the position of the tailstock 29 on the table. Provision is made, therefore, for adjusting the position of the dog 48 with respect to the dog 46 to lengthen or shorten the table travel. Any suitable means may be employed, such as a series of definitely spaced bolt holes in the table edge by means of which the slide 47 may be secured in different positions along the length of the table. The dog 48 may also be raised in its slide so that it will clear the lug 44 of the reversing lever and permit further travel of the table to the right to a loading position where the tailstock centers clear the cutter heads, as will be set forth later.

Preferably, the reversing valve 38 is of a slide or piston type, hydraulically actuated through the pilot valve 41 to admit fluid to either end of the hydraulic cylinder 31 and exhaust the fluid from the opposite end. As stated above, the table is constantly moved against a back pressure and its movement is retarded at the end of each stroke just prior to reversing. A hydraulic control system for obtaining these results is disclosed in Figure 30 where the parts are shown diagrammatically, as many commercial valves will be found suitable.

The valve 38, as illustrated, may comprise a casing or cylinder 49, closed at both ends, and is provided with connected inlet ports 50 and 51, which communicate with the fluid supply line 39, an exhaust port 52 connecting with the discharge line 40, and a pair of ports 53 and 54 which connect respectively with the lines 36 and 37 leading to the ends of the hydraulic cylinder 31. Slidably mounted within the cylinder is a plug or piston 55 suitably grooved to connect the supply line 39 and the exhaust line 40 respectively with the lines 36 and 37 when the piston 55 is at one end of the valve cylinder, and to connect the supply line with the line 37 and the line 36 with the exhaust when it is at the opposite end of the cylinder.

Connecting opposite ends of the valve cylinder 49 with opposed ports of the four-way pilot valve 41 are lines 56 and 57, while a third line 58 and a fourth line 59, respectively connect the supply pipe 39 with the inlet port of the pilot valve and the exhaust port with the fluid return line 40. The valve 41 may be, as shown, provided with a rotary plug 60 actuated by the lever 42 to connect either end of the reversing valve cylinder 49 with the pressure line 58 and the opposite end with the exhaust line 59.

As stated above, provision is made whereby the table is moved constantly against a back pressure of the hydraulic fluid and also for slowing down its movement at the end of each stroke just prior to reversing. The first of these effects is accomplished by means of a two-way valve 61 positioned in each of the lines 36 and 37. These valves are in effect check valves which open fully to permit a full flow of fluid to the high pressure side of the cylinder 31 and only partially open to retard the flow of fluid from the low pressure end, to thereby create a back pressure on the low pressure side of the hydraulic piston.

The table movement is slowed down at the end of each stroke by two way valves 62 and 63 positioned respectively in the lines 36 and 37. The plugs 64 of these valves move vertically in the valve casing, being maintained normally in up (open) positions by a compression spring 65. The plugs are provided with a transverse bore, which normally permits a full flow of the hydraulic fluid to the cylinder 31 but, when depressed, will restrict the flow and thereby slow down the movement of the piston 30. The plugs 64 are each provided with an upwardly extending stem which terminates in a head or cam follower 66.

Fixedly secured to the tailstock end of the edge of the table 7 is a cam 67 having an inclined rise surface 68 and a horizontal dwell surface 69. This cam is adapted to engage the follower 66 of the valve 63 and is so positioned with respect to the reversing dog 46 that it will start to depress the valve plug 64 just before the dog 46 first contacts the lug 43 of the reversing lever 42. By the time the dog 46 engages the lug 43 the rise 68 of the cam will have depressed the valve plug to partially close the valve. Preferably, the amount of the cam rise is such that when the follower reaches the flat dwell, the valve will just be cracked. It is to be noted that this valve closing will be gradual and the movement of the table will be gradually slowed down. During the continued slow movement of the table to the left, the lever 42 will be rocked, the reversing valve 38 actuated and the return stroke of the table begun. This return movement starts slowly and is gradually accelerated as the follower of the valve plug rides again over the rise 68 of the cam resulting in a smooth vibrationless reversing movement.

At the opposite end of the table is a cam 70 adapted to cooperate with the valve 62. The position of cam 70 bears a definite relationship with the reversing dog 48 and means similar to that for locating the slide 47 carrying the dog 48 may be provided for changing the position of this cam on the edge of the table with changes in position of the dog 48. The cam 70 is provided with a rise 71, similar to the rise of the cam 67 and serves a similar purpose, that is, to gradually depress the plug of the valve 62 before the dog 48 rocks the reversing lever 42. The dwell 72 of the cam 70, however, is extended and terminates in a second and more abrupt rise 73. The length of the flat dwell 72 is such that, when the dog 48 is raised to clear the reversing lever, the table 7 will continue to travel slowly to the right until the tail stock centers clear the cutter heads, at which time the second rise 73 will fully close the valve 72 to stop the table movement. The lever 42 is then manually rocked to its other position preparatory to the return stroke of the table, which may be started by pushing the table to the left the short distance necessary to again crack the valve 62. In lieu of this method of restarting table movement, a valve controlled line bypassing the valve 62 may be provided.

The headstock and tailstock

Reference is now made to Figures 5 to 12 which illustrate in some detail the headstock 28 and its associated mechanism for supporting and rotating the blade blank and model or pattern about their longitudinal axes.

The headstock 28 comprises a substantially rectangular base 74 to which is secured an upstanding frame 75 consisting of a front plate 76, rear plate 77, and side plates 78 and 79, rigidly joined together, and to the base 74, preferably by welding. The headstock is fixedly secured to the upper surface of the table 7 adjacent one end thereof by bolts 80 passing through the base 74 and into the table and is longitudinally aligned on the table by keys 81, secured in grooves therefor in the lower surface of the base, and fitting in a keyway 82 extending longitudinally the full length of the table, centrally between the edges and accurately aligned in parallelism with the ways 6.

Passing transversely through the front and rear plates 76 and 77 in the lower part of the frame 75 is a cylindrical sleeve 83 secured to the plates 78 and 79 in accurate alignment with the keys 81. Passing axially through the sleeve 83 and journalled for free rotation in ball bearings 84 set in opposite ends of the sleeve, is a spindle 85. Formed on one end of the spindle 85 (the end facing the tailstock 25) is a flange 86 while the opposite end is formed into a diametrically reduced extension 87 having a further reduced, screw threaded end 88.

Above the sleeve 83 and secured to the upper end of the frame 75, parallel with the sleeve 83, is a similar sleeve 89 provided at opposite ends with ball bearings 90 in which is journalled a spindle 91. This spindle is likewise provided on one end with a flange 92 and on the opposite end with a reduced extension 93 which terminates in a screw threaded end 94. The bearings 84 and 90 have deep grooved races so that the bearings may take both radial and thrust loads. The sleeves 83 and 89 are each provided at their ends with flexible oil seals designated generally as 95.

Secured to the flange 92 of the upper spindle 91, by circumferentially spaced bolts 96, is the flanged end 97 of a socket chuck 98 having a socket 99, axially aligned with the spindle, and provided with a flat inner end 100 and a longitudinal keyway 101. This chuck is for holding the shank end of the master model or blade pattern P, the shank of which is machined to closely fit the socket being keyed therein by a key 102 carried by the shank and fitting within the keyway 101. The end of the model shank is faced off squarely and abuts the flat inner end 100 of the socket.

The lower spindle 85 carries an axially aligned work chuck designated generally as 103 for holding the shank end of the work or blade blank W, and is provided with a circular mounting flange 104 attached to the flange 86 by means of bolts 105. The flange 104 is provided with a concentric, internally threaded socket 106 having a central circular depression 107 therein axially aligned with the spindle.

The chuck 103 is of a draw up collet type fitted with a split collet 108 machined internally to correspond with the shank of a finished blade. In the type illustrated, the collet is for a blade of the kind adapted to screw thread into its hub and the collet is provided with a blind bore 109 having internal threads 110 adjacent its inner end to correspond with the internal threads of the hub socket into which the blade will fit. The forward or jaw portion 111 of the collet is bored to the diameter of the blade shank and has a tapered external peripheral surface 112. The back of the collet is the same diameter as the depression 107 into which it fits and is secured by countersunk screws 113.

A closing collar 114 surrounds the collet and is provided with an internal taper 115 corresponding to the taper of the collet. The collar 113 is provided at its inner end with an external flange 116 which is engaged by a draw in ring 117, is threaded externally and screw into the threaded socket 106. For different types of blades, obviously different collets will be provided. A clamping chuck also serves effectively for supporting the blade and pattern in fixed relation to the spindles 85 and 91. Any type of chuck found suitable under the working conditions may be used.

In order to rotate the spindles 85 and 91 in synchronism for simultaneously indexing the work and pattern, the ends 87 and 93 have respectively keyed thereon identical spur gears 118 and 119, both of which mesh with an idle gear 120. The idle gear 120 is mounted for rotation on ball bearings 121 carried on a stud 122 affixed to a slide plate 123. The plate 123 is adjustably secured, by countersunk cap screws 124 passing through somewhat elongated apertures 125 in the plate 123, to a plate 126 which is inset below the rear face of the back frame plate 77. This construction provides a cross slide for the idle gear 120 permitting lateral adjustment of this gear toward and away from the gears 118 and 119. Movement of the slide plate 123 closer to the vertical center line of the gears 118 and 119 will bring the idle gear 120 into closer mesh therewith and eliminate backlash in the gears when motion is transmitted from the lower to the upper spindle, and the rotation of the two spindles 85 and 91 will be perfectly synchronized. One or more apertures 127 may be provided through the gear 117 for access to the holding screws 124.

For rotating the spindles, there is keyed to the extension 87 of the work spindle 85 a worm gear 128 adapted to mesh with a worm 129 carried on a shaft 130 which extends transversely of the headstock. The shaft 130 is journalled in a pair of bearings 131 supported respectively in blocks 132 positioned at each end of the worm, antifriction thrust collars 133 being provided between the ends of the worm 130 and the bearings 131 to eliminate end play of the shaft. The bearing blocks 132 are secured to the upper surface of one arm 134 of an L-shaped bracket 135 (Figure 8), the other arm 136 of which extends parallel to the bed of the machine and is hinged, as indicated at 137, to a support 138 bolted to the bed 7 at the side of the headstock. Side plates and a top plate, slotted for the worm gear, are respectively attached to the sides and tops of the bearing blocks 132 and form therewith, and with the bracket 135, a lubricant case for the worm gearing, as seen in Figures 6 and 7.

By referring to Figures 7 and 8 it will be noted that the bracket 135 is positioned at the rear and on one side of the headstock frame 75 with the axis of the hinge 137 extending longitudinally of the machine bed permitting the worm 129 to be swung toward and away from the worm wheel 128. The worm 129 may be held in engagement with, or disengaged from its gear 128 by means of a rocker shaft 139 extending under the bracket arm 134 adjacent the free end thereof, and provided with a cam 140 which engages the under surface of the bracket. The shaft 139 is journalled in parallel sides 141 of a support 142, the sides 141 extending upwardly to engage opposite edges of the bracket arm 134 to serve as a guide therefor.

The worm shaft 130 is adapted to be driven either manually or automatically. For manual operation a hand wheel 143 is provided on the end of the shaft which extends to the operator's side of the machine. For automatic operation, the opposite end of the shaft has keyed thereto a sliding gear 144 which is adapted to mesh with a mating gear 145 carried on the driven shaft 146 of a right angle speed reduction unit 147. This speed reducer is mounted at the angle of the L shaped bracket 135 and has its driven shaft 148 coupled to the shaft of a small electric motor 149 carried by arm 136 of bracket 135.

For manual rotation of the spindles, obviously the worm shaft must be disconnected from the reduction gear. To accomplish this, the hub of the gear 144 is provided with an annular groove 150 in which rides a fork 151 carried on one end of a rod 152. The rod 152 extends through the bearing blocks 132 and is provided on its opposite end with a handle 153 by means of which the rod may be moved longitudinally to engage or disengage the gears 144 and 145. Manual rotary adjustment of the work may be desirable at times during the operation of the machine and this simple mechanism provides means for easily disconnecting the automatic indexing mechanism for manual rotation of the spindles 85 and 91.

It is also desirable when performing certain operations on the blade, such as will be set forth later in the description, to permit free rotation of the work and pattern, that is, independently of the indexing mechanism. This is accomplished by manipulation of a finger engaging lever 154 secured to the outer end of the shaft 139 and by means of which the shaft may be rocked and the cam 140 rotated. With the parts in the position shown in Figures 7 and 9, the major axis of the cam 140 is normal to the bracket and the worm is meshed with the worm gear. This position of the cam is maintained by the engagement of the lever 134 with one of the two pins 155 on opposite sides of the shaft 139. When the lever is moved until it engages the opposite pin, the minor axis of the cam will be normal to the bracket, the weight of the arm 134 and its supported structure rocking the bracket about its hinge and disengaging the worm from the gear 128.

Enclosing the above described gearing is a case or housing 156 secured to the headstock.

Secured to the end of the spindle 85 is an indexing plate designated generally as 157, and which will be described in more detail in the following section of this specification which deals with the work indexing. This plate is fitted over a short, reduced extension of the hub of the worm gear 128, drawn up against the hub by a washer and nut 158, and additionally secured to the hub to prevent relative rotation therewith, by a cap screw 159. The nut 158, screwed onto the extension 83 of the spindle, also serves, in cooperation with the bearings 84 and suitable spacing sleeves 160, to eliminate end play of the spindle. In a like manner a nut 161 eliminates end play of the upper spindle 91.

The tailstock 29 is best illustrated in Figures 14 to 17 and comprises a rectangular flat base plate 162 which carries a rigid, vertical stand 163 preferably built up, in the manner of the headstock 24, of a front plate 164, a back plate 165, and side plates 166 welded thereto. In addition, to add rigidity to the member, an intermediate vertical plate 167 is also welded to the side plates. The stand 163 is welded to the base plate and suitably braced thereon by angle plates such as shown at 168.

The tailstock is secured to the table 7 for longitudinal adjustment thereon, by means of bolts 169 passing through the base plate and engaging a pair of T-shaped gibs 170 slidably fitted within parallel T slots 171 in the upper surface of the table and extending longitudinally from the tailstock end thereof. The tailstock is longitudinally aligned with the headstock 24 by keys 172 carried in aligned grooves 173 therefor and fitted within the keyway 82 in the table. By loosening the bolts 169, the tailstock may be moved longitudinally along the table to vary the distance between it and the headstock for the accommodation of blades of different lengths.

Secured to the stand 163, and passing therethrough in axial alignment with the headstock spindle 85, is a cylindrical sleeve 174 carrying a concentric quill 175, the rear extremity of which is provided with external screw threads 176. The quill has an axial through bore 177 each end of which is fitted with a ball bearing 178 journalling a spindle 179. The spindle is held against end play in the quill 175 between a shoulder 180 engaging the inner race of the forward bearing 178 and a nut and washer assembly 181 fitted on the rear extremity of the spindle and engaging the inner race of the rear bearing.

The spindle 179 is also provided with a concentric, axial through bore 182 which is tapered in its forward end to receive the tapered shank 183 of a center 184 which is adapted to support the tip end of the blade blank W held by the chuck 103. This tailstock center may be of various types, depending on the material supported thereby, but a cup, or female center such as that shown in Figure 17 has been found satisfactory for use with wood, metal or plastic work. If desired, a draw-in rod 186 may be used with the centers. Such a rod is shown in Figure 17 extending through the bore 182, threaded at one end into the center, and provided on its opposite end with a nut 187 which engages the end of the spindle. This rod also serves as a knockout rod for the center.

For adjusting the quill 175 longitudinally in the sleeve 174 the threaded portion 176 of the quill has threaded thereon a gear 188 which meshes with a second gear 189 carried on one end of a shaft 190. This shaft is journalled in a sleeve 191, extending through the stand 163 below the sleeve 174 and parallel therewith. The opposite end of the shaft 190 is provided with a hand wheel 192. Placing the hand wheel thus, at the front end of the tailstock, makes it more easily accessible to the operator when the table is moved to the loading position (see Figure 1).

The gears 188 and 189 are contained within a gear box 193, affixed to the rear plate 165, and provided with a removable cover 194. As shown in Figure 14, the sleeves 174 and 191 extend into the gear box and the gears 188 and 189 are held against axial displacement between the ends of the sleeves and the cover of the gear box.

For locking the quill 175 in adjusted position, two axially aligned, opposed plugs 195 are slidably fitted in a transverse aperture 196 in the upper portion of the forwardly projecting end of the sleeve 174. The edges of adjacent ends of each plug are machined with an arcuate face 197 (see Figure 16), for engaging the outer surface of the quill, and are adapted to be drawn together to clamp the quill therebetween by a bolt 198 passing through one plug and having a screw threaded engagement with the other.

The tailstock center for the blade pattern P is preferably a 60° male center such as shown at 199 in Figure 14 and is provided with a tapered shank fitting a similarly tapered socket 200 in the forward end of the through bore 201 of a quill 202. The quill 202 is slidably carried in a sleeve 203 secured to the upper end of the tailstock, in axial alignment with the headstock spindle 91. The quill 202 may be adjusted longitudinally in its sleeve by means of a feed screw 204, threaded into the quill bore 201. The screw is journalled in and projects through a back plate 205 secured to the sleeve 203 and has a hand wheel 206 pinned to its projecting end. Adjusted position of the quill 202 may be maintained by a locking device 207 which is identical with that described above in connection with quill 175 of the work center.

In order to permit the table 7 to be moved fully to the right hand end of the bed, or the loading position of the machine, where the tail stock must pass between the cutter heads 24 and 25, the following means shown in Figures 2, 14 and 15 are provided for spreading the cutter heads apart.

Welded to the top of the sleeve 203 is support 208 having a flat upper surface on which is slidably mounted a flat plate 209. This plate, as best seen in Figure 2, has parallel longitudinal edges 210 which converge at their forward ends in a substantial S curve to provide opposed cam surfaces 211. The plate 209 may be adjusted a certain amount longitudinally of the table— that is, in the direction of travel of the table 7— and secured in adjusted position by a thumb nut 212 cooperating with a screw 213 secured into the support and extending through a longitudinal slot 214 in the plate. Longitudinal alignment of the plate 209 is maintained by means of a key 215 engaging longitudinal keyways 216 and 217 respectively in the upper face of the support and under face of the plate.

When the table is moved to its loading position the model follower rolls carried by the cutter heads ride over the cam surfaces 211 and onto the sides 210 of the plate 209 and thereby move the cutter heads sufficiently far apart to permit the tailstock to pass between the cutters (see Figure 3). The cam plate 209 may likewise, by adjusting forwardly, be utilized to automatically move the cutters slightly away from the work at the tip end of the work feed to permit indexing with the cutters out of engagement with the blade blank. This may be desirable in reducing the loads imposed on the pattern when indexing during formation of the blade faces adjacent the leading and trailing edges of the blade.

The indexing mechanism

The blade blank or work W and the model or pattern P are respectively supported in parallel, superposed relation, between the chuck 108 and center 184 and between the chuck 98 and center 198, respectively; and, as heretofore set forth, are capable of synchronized rotation through the headstock gears 118, 119 and 120. This rotation may be effected either manually by means of the hand wheel 143 or mechanically by the electric motor 149, the operation of which is automatically controlled to index the work and pattern at the end of each feed stroke of the table as will now be described.

As stated above, an indexing plate 157 is associated with the work spindle 85 for rotation therewith. This indexing plate is a circular disc having a series of notches 218 spaced about its periphery. The spacing of these notches will depend upon the amount of indexing or the degree of rotation desired for a particular operation. For instance, in making roughing cuts on the work, the indexing will be in greater amounts and the indexing plate will have fewer notches than when finishing cuts are made. Also the spacing may vary at different regions of the plate, since rotation through greater angles between cuts on certain surfaces of the blade can be effected than between cuts on other surfaces of the blade. These plates may be easily and cheaply made and easily substituted one for another on the machine, and preferably a series, having different spacing of the notches, is provided.

The indexing plate is, in effect, a cam, the notches 218 formed with an angular face and an adjacent radial face which react, upon rotation of the plate, on a tooth or follower 219 on one end of a rocking lever 220 which is pivoted on a stud 221 attached to a supporting angle bracket 222 secured to the table 7. The opposite end of the lever 220 engages the button 223 of a single circuit push button switch 224, likewise secured to the support 222, and constituting a stop switch for the motor 149. A spring loaded plunger 225, traveling vertically in a guide 226 carried by bracket 222, urges the fore end of the lever toward the indexing plate so that the follower 219 constantly engages the notched periphery of the indexing plate. When the parts are in the position shown in Figure 11, with follower tooth 219 at the bottom of a notch 218, the switch will be closed and will open when the follower rides up the angular face of a notch.

A two-circuit push button starting switch 227 for the motor 149 is located on the machine bed directly below the overhanging edge of the table 7 as shown in Figures 2 and 13. This switch has its operating button 228 in the path of a pair of operating dogs 229 and 230 pivotally attached to the edge of the table 7. The location of the dog 229 which is at the headstock end of the table, is fixed while the other dog 230 is adapted to be adjustably positioned on the table with respect to the dog 229 so that the distance therebetween will be the same as that between the table reversing dogs 46 and 48.

The switch dogs 229 and 230 are short, pendulum swung bars freely movable in one direction and having their movement blocked in the opposite direction by an abutment pin 231 as shown in Figure 13. The lower end of each dog is cut at an angle to provide an inclined face 232 for depressing momentarily the button of the switch 227 when each dog rides over the button as the table moves in one direction only. It will be noted that the faces 232 of the dogs 229 and 230 are oppositely inclined and also that their blocked movement is opposite. Thus, when the table moves in the direction of the arrow in Figure 13 the dog 230 will momentarily depress the switch button 228 when the inclined face moves thereover near the end of the table stroke but the dog 230 will swing upwardly and ride over the switch button on the return stroke of the table. When the table reaches the end of its return movement, or to the left, the switch will be actuated in the same manner by the oppositely swingable and inclined dog 229.

From the above description, it will be seen that as the table 7 nears the end of its travel in each direction the starting switch 227 will be actuated and start the indexing motor 149 which will operate until the tooth 219 of the switch lever 220 rides into the succeeding notch 218 of the indexing plate 157 at which time the stop switch 224 is actuated to break the motor circuit and stop the motor. The retarded movement of the table at the end of its strokes provides ample time for the indexing operation between succeeding cuts. During the cutting operations the work and pattern will be rigidly held against rotation by the irreversible worm and gear 129 and 128, and, as will be described, the indexing motor circuit will be locked open.

A high reduction ratio is desired between the motor 149 and the spindle 85 to provide accurate indexing and reduce overrunning of the spindles when current to the motor is broken. For example, with an 1800 R. P. M. motor, a 30 to 1 ratio in the reduction gear 147 and an 80 to 1 reduction in the worm gear drive 128—129 has been found to operate satisfactorily without supplemental braking mechanism. However, where extreme precision in indexing is desired, a suitable brake may be incorporated with the high speed side of the drive, for instance, on the motor shaft or input shaft of the speed reducer 147. Many types are available and well known and it is not thought necessary to illustrate one here. A solenoid actuated brake on the motor shaft is very effective. Electric motors equipped with solenoid brakes operable upon breaking the power circuit to the motor are commercially available and are suitable for use as motor 149.

Figure 31:
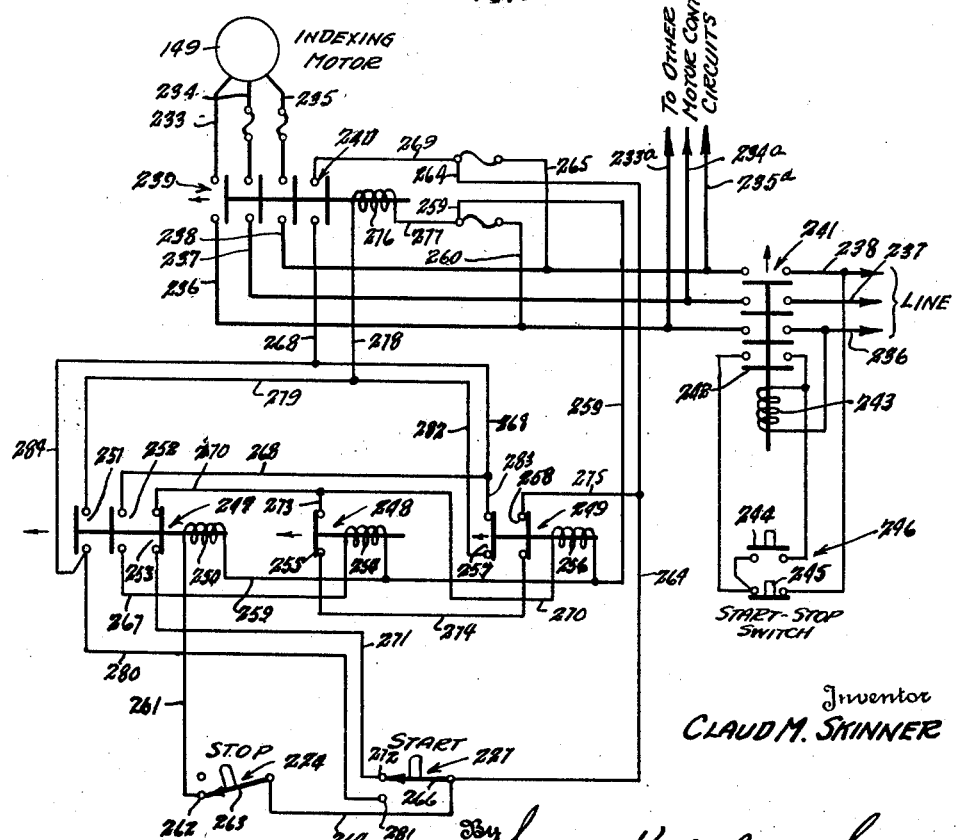
Figure 31 is a schematic wiring diagram of the electric indexing control circuit.

The electric control for the indexing motor 149 is shown by the schematic wiring diagram in Figure 31. Leads 233, 234 and 235 for the indexing motor 149 are adapted to be respectively connected with a three phase current source through supply lines 236, 237 and 238 by means of a normally open motor control relay 239 which has, in addition to line contacts, a normally open, maintain contact 240. The supply lines 236, 237 and 238 are normally broken by a normally open line relay 241 which is likewise provided with a normally open maintain contact 242. Connecting with the lines 236, 237 and 238 on the output side of the relay 241 are branch lines 233a, 234a, and 235a which supply current for the operation of the other machine motors such as motors for operating the rotary cutters and hydraulic pump.

The winding 243 of the line relay 241 is adapted to be connected across the supply line 236 and 238, on the input side of the relay, through a two-point make, push button, starting switch 244 and a two-point break, push button, stop switch 245, connected in series therewith, and constituting a start-stop switch 246 for the machine. The maintain contacts 242 for the relay 241 are connected in parallel with the start switch 244 and in series with the stop switch 245. Momentarily closing the start switch 244 closes the contacts of the line relay 241 by energizing the winding 243 which is maintained energized through the contacts 242 and the stop switch 245 until the circuit is broken by opening the stop switch. Closing the relay 241 starts the pump motor and cutter motors and closes the line to the indexing motor relay 239.

Operation of the relay 239 is effected by means of the indexing start switch 227, the indexing stop switch 224, and three interlocked control relays 247, 248 and 249. The relay 247 has a winding 250, two normally closed contacts 251 and 252 and a normally open contact 253. The relay 248 has a winding 254 and a single normally closed contact 255, while the relay 249 has a winding 256 and two normally open contacts 257 and 258. One end of each of the windings 250, 254 and 256 is connected to a common lead 259, a fuse and lead 260 to the power line 236. The opposite end of the winding 250 is connected through a lead 261 to the contact point 262 of the indexing stop switch 224 whose contactor 263 is connected by a lead 264, a fuse and lead 265 to the power line 238. The leads 265 and 264 likewise connect the power line 238 with the contactor 266 of the indexing start switch 227. The other end of the winding 254 is connected with the power line 238 through a lead 267, contacts 252 of the relay 247, lead 268, maintain contacts 240 of the indexing motor relay 239, and a line 269 which connects, through the fuse with the lead 265. The other end of the winding 256 connects with the power line 238 through a lead 270, contacts 253 of the relay 239, lead 271, contact 272 of the indexing start switch 227, and contactor 266, to lead 264. The lead 270 from the winding 256 also connects with the power line 238 through a lead 273, contacts 255 of the relay 248, a lead 274, contacts 258 of relay 249 and a lead 275, to the lead 264.

The winding 276 of the indexing motor relay 240 has one of its ends connected with the power line 236 by a lead 277 which connects through a fuse with the line 260. The opposite end of the winding 276 connects with the other power line 238 through a line 278 and thence through a lead 279, contacts 251 of relay 247, a lead 280 to the second contact 281 of the indexing start switch 227 and thence through its contactor 266 to leads 264 and lead 265 to the power line 238. The second end of winding 276 is also connected through lead 278, a lead 282, contacts 257 of relay 249, and a lead 283 which connects with the lead 268, and thence through maintain contacts 240 of motor relay 239 to the line 238. The maintain contacts 240 of the motor relay are connected in series with the contact 281 of the starting switch 227 through a lead 284 which connects the line 280 with the line 268.

Momentarily closing the starting switch 244 energizes the relay 241 which closes and is maintained closed through maintain contacts 242 and starts the hydraulic pump and cutter motors through lines 233a, 234a and 235a and supplies energy for the indexing motor 149 and its control circuit through the lines 236, 237, and 238. Of course, separate control devices may be included in lines 233a, 234a and 235a for independent control of the devices supplied by power through these lines. Considering the table 7 between the ends of its strokes, the tooth 219 of the switch lever 220 will be at the bottom of one of the notches 218 and the stop switch 224 will be closed as shown in Figure 31. With the switch 224 closed, the winding 250 of the relay 247 will be energized, the contacts 251 and 252 open, and the contacts 253 closed. The winding 256 of relay 249 will also be energized through the closed contacts 253, and contact 272 of the starting switch 227.

When the table 7 nears the end of its travel, one of the dogs 229 or 230 momentarily depresses the button 228 of the starting switch 227, its contactor 266 breaking with switch point 272 and contacting point 281. With the switch 227 in this position, current will flow from the power line 238 through leads 265 and 264, switch point 281, lines 280, 284, 268 and 283, closed contacts 257 of relay 249, lines 282 and 278, winding 276 of motor relay 239, lines 277 and 260 to power line 236. This energizes winding 276 and closes the contacts of the relay 239 which supply current to motor leads 233, 234 and 235 from the power line to put the indexing motor 149 in operation. When the switch 227 breaks the contact 272, the relay 249 will remain closed, its winding 256 being energized through its maintain contacts 258 and the normally closed relay 248. The switch button 228 is only momentarily depressed, the switch returning to its normal position with the contactor 266 contacting the point 272 when the table moves on to the end of its stroke. The motor relay 239 will be maintained closed, however, after the starting switch 227 returns to its original position by current flowing from power line 236 through lines 260 and 277, winding 276, lines 278 and 282, contacts 257 of relay 249, lines 283 and 268, maintain contacts 240 of motor relay 239 and lines 269 and 265 to power lines 238.

The operating motor will slowly rotate the spindles 85 and 91 through the above described gearing and likewise the indexing plate 157 attached to the spindle 85. As this indexing plate rotates the angular face of the notch 218 receiving the tooth 219 of the lever 220 will depress this end of the lever and open the stop switch 224. When the switch 224 opens, the circuit to the winding 250 of the relay 247 is broken and this relay drops out, closing the contacts 251 and 252 and opening contacts 253. Closing of contacts 252 causes winding 254 to become energized and the relay 248 opens. When the relay 247 drops out the relay 249 likewise drops out, its winding circuit being broken by opening of contacts 253 and contacts 255. Contacts 257 are now open but the motor relay 239 is maintained closed by current flowing from line 236 through lines 260 and 277, winding 276, lines 278 and 279, the now closed contacts 251 of relay 247, lines 284 and 268, maintain contacts 240 of motor relay, lines 269 and 265 to power line 238. The indexing motor continues to operate until the indexing plate 157 has rotated sufficiently for the tooth 219 to ride into the next notch 218 when the spring plunger 225 will rock the lever 220 to again close the stop switch 224. This again energizes the winding 250 and opens contact 251, thus breaking the circuit to the motor relay winding 276, causing this relay to drop out and break the power circuit to the motor. Closing of the stop switch 224 at the same time energizes relay 249 and de-energizes relay 248 preparatory for the next indexing operation when the table 7 completes its travel to the opposite end of the bed. It will be noted that the above control circuit for the indexing motor is so interlocked that, providing the worm 129 is engaged with the worm wheel 128, indexing movement of the blade blank and pattern are only permitted at the end of the table strokes and moreover the indexing rotation cannot be stopped until completed except by stopping the whole machine by means of the stop button 245.

If the blank and pattern have been indexed by hand, as above set forth, and the position of the indexing plate is such, with respect to the switch lever 220, that the stop switch is open— that is, if the tooth 219 is not at the bottom of one of the indexing notches—the automatic indexing will be resumed at the end of the next table stroke when the starting switch 227 will be actuated. In this case, however, the motor relay will be energized by current flowing from line 236 through lines 259 and 277, winding 276, lines 278 and 279, contacts 251 of relay 247, line 280, contact 281 of switch 227, and lines 264 and 265 to line 238.

*The cutter heads*

The cutter heads 24 and 25, shown in the main views of the machine, Figures 1, 2 and 3 and illustrated in more detail in Figures 19 to 29 are, as above set forth, mounted for movement transversely to the path of movement of the table, on opposite sides of the bed 1. They are essentially similar in construction except they are made for right and left hand position on the machine with the cutters aligned, and only one will be described, the same reference numerals being employed for corresponding parts of the two heads. The cutter heads will be designated right and left hand from their positions as seen looking toward the tailstock end of the machine as in Figure 3, 24 designating the left and 25 designating the right hand cutter head. The right hand side of each cutter head will be that facing the headstock (as viewed in Figures 1 and 2) and the front of the heads will be the ends facing the bed 1.

Each cutter head comprises a box-like carriage 285 having a front wall 286, a rear wall 287, and right and left hand side walls 288 and 289 joining the front and rear walls. The carriage rides in the trough 19 of the cutter stand, being supported for rolling movement on the tracks 22 by roller assemblies 290 and 291 carried respectively by the right and left hand side walls 288 and 289.

The left hand roller assembly 291 comprises an angle member 292 suitably secured to the carriage side walls and to a braced horizontal mounting pad 293 adjacent the upper edge of the side wall. The angle member extends substantially the length of the carriage and supports roller journal blocks 294 fitting in angular cut-outs 295, at each end of the angle member 292, and secured therein by cap screws 296 passing through the angle member 292 and into the block and cap screws 297 passing horizontally through the block and into the side wall 289. As best seen in Figures 20, 21 and 22 the journal blocks 294 are provided with a longitudinal groove 298, adapted to straddle the track 22. Preferably the block 294 is made in two laterally abutting portions, the inner or abutting face of the outer portion being provided with a circular socket 299, which breaks through the lower face of the block into the groove 298 as best seen in Figure 22. A roller 300 is positioned in the socket 299 and extends slightly below the lower face of the block to engage the upper surface of the track 22. Preferably the rollers 300 are radial ball bearings, the outer races being adapted to ride on the track 22, and the inner race pressed onto a horizontal pin 301 fitted in a transverse aperture 302 axially aligned with the socket 299.

To guide the carriage on the tracks 22, the lower face of each of the blocks 294 is provided with a pair of circular sockets 303, bored vertically into the block on each side of the grooves 298 and breaking into the groove. A roller 304 is positioned in each of the sockets 303. These rollers 304 are likewise preferably radial ball bearings having their outer races engaging opposite vertical faces of the tracks 22 and their inner races carried on studs 305 pinned into vertical apertures 306 bored concentrically with the sockets 303.

The bottom wall and both side walls of the groove 298, at opposite ends of the groove are cut back at an angle, as shown in Figures 21 and 22 and fitted with resilient scrapers 307 and 308 which engage respectively the upper and side surfaces of the tracks 22 to keep the paths of the rollers 300 and 304 scraped clean of any obstruction to the rollers and assure free, accurate movement of the carriage.

The roller assembly 290 on the right hand side of the carriage is similar to the roller assembly 291 just described except that guide rollers are only required on one side of the carriage and are omitted from the roller assembly 290 and the roller journal blocks are somewhat smaller.

Attached to the front plate 286 and projecting forwardly therefrom adjacent the top and bottom edge is an upper bearing block 309 and a lower bearing block 310 (Figure 19). As best seen in Figure 23, the blocks 309 and 310 are each provided with a vertical bore 311 axially aligned with each other and each having a slight internal shoulder 312 at its lower end. An upper cap 313 and a lower cap 314, each having on its lower face an annular spigot 315 surrounding a circular recess 316, are respectively positioned on the upper face of each bearing block with the spigot 315 fitting within the bore 311. Each cap is bored with an aperture 317 concentric with the spigot 315. Fitting closely within the bore 311 respectively of each bearing block, between the shoulder 312 and the spigot 315, are the outer races of a pair of upper and lower ball bearings 318 and 319. Lubricant reservoirs 320 and 321 consisting of a plate 322 having an annular recess 323 surrounding a central dam 324, are respectively fitted against the lower face of the bearing blocks 309 and 310. The recess 323 is adapted to hold a supply of lubricating oil which may be introduced through a normally plugged filling hole 325 in the side of the reservoir. The caps and oil reservoirs are secured to their respective bearing blocks by means of cap screws 236 which are countersunk into the cap, pass through the bearing block and are threaded into the bottom plate 232.

Fitted into the inner races of the upper bearings 318 is a quill 327 provided, intermediate its ends, with an external, integrally formed, collar 328. The upper surface of this collar provides a shoulder, against which the lower face of the inner ball race fits, and an outwardly and downwardly projecting baffle extending over the dam 324. The lower end of the quill extends through the oil dam 324 and terminates in a flat face slightly below the lower surface of the bottom plate 322. The upper end of the quill extends upwardly through the aperture 317 in the cap 313 and has keyed adjacent its upper extremity a V-grooved pulley 329. Positioned on the quill and engaging the upper face of the inner race of the bearing 318 is a peripherally grooved collar 330 which extends radially slightly beyond the inner bearing race, and between the collar 330 and the pulley 329 is a spacing sleeve 331. The quill is securely held against end play in the bearing by a lock nut assembly 332 which is screwed up onto the end of the quill against the upper face of the pulley drawing the flange 328 on the quill tightly against the inner bearing race. The quill 327 is bored axially and provided with an internal keyway 333 extending the length thereof.

A lower quill 334, having an axial bore 335, is fitted within the inner race of the bearing 319, extends upwardly through the aperture 317 in the cap 314 and terminates in the flanged head 336 having a transverse rib or key 337 across its upper face. Around the quill and engaging the lower face of the flange 336 is a spacing sleeve 338 between which and the inner race of the bearing 319 is a collar 339 peripherally grooved and extending slightly beyond the inner race in the manner of the collar 330. The lower end of the quill 334 projects below the bearing into a well 340 in the bottom plate 322 and has fitted thereon a collar 341, which is drawn up into engagement with the lower face of the inner ball race of bearing 319 by a lock nut assembly 342 screwed up on the lower end of the quill. The collar 341 projects angularly downward over the oil dam 324 and serves as a baffle, covering the well 340.

To lubricate the bearings 318 and 319, wicks 343 and 344 extend upwardly respectively from the oil reservoirs 320 and 321, through apertures 345 in the bearing blocks and slots 346 in the caps, to engage respectively the grooved collars 330 and 339. Oil, which is drawn up the wicks, is wiped off onto the grooved collars 330 and 339 from which it is thrown off at high speed in a fog which gives the desired lubrication for the bearings, flows through the bearings, over the collars 328 and 341 back into the reservoirs. It will be noted that the collar 328 and the dam 324 prevent leakage of oil through the quill hole in the oil reservoir 320 and the collar 341 and oil dam will prevent oil entering the well 340.

Positioned between the upper and lower quills 327 and 334 is the cutter, mounted on an arbor 347 carried in the quills. The cutter has a cylindrical body 348 which is sufficiently long to cover the maximum chord of the blades machined. Various types of cutters may be employed, depending upon the material machined, but preferably are provided with spirally arranged teeth which may be either fixed or removable. For shaping wooden blades a spiral cutter, such as shown, and made of high speed steel has been found satisfactory. This type of cutter has also been found suitable for use on both wood and some aluminum alloys. On some alloys and plastics, however, a cutter with carbide tipped teeth has been found preferable. The cylindrical body 348 of the tool is fitted with upper and lower axial bushings 349 and 350 pressed into the upper and lower end of the central bore 351 resting respectively on shoulders 352 and 353 and have their outer faces flush with the end faces of the cutter. The upper bushing 349 is axially bored to the same diameter as the bore of the quill 327 and is provided with an internal longitudinal keyway 354 which matches, and is adapted to align with the keyway 333 in the quill. The bottom face of the lower bushing 350 is provided with a transverse groove 355 into which the rib 337 on the head of the lower quill 334 is adapted to fit. The lower end face of the cutter is slotted at 356 in register with groove 355 and cooperates therewith for the reception of the rib 337.

The arbor 347 is provided with a head 357, which may be knurled to facilitate handling, and a stepped shank, the larger portion 358 of which extends from the head 357 a sufficient distance to pass through both the upper quill 327 and the upper cutter bushing 349, and is of a diameter to provide a close sliding fit in the quill and bushing. This portion 358 of the arbor is fitted with a longitudinal key 359 adapted to fit the keyways 333 and 354 in the quill and upper bushing of the cutter. Below the section 358 the arbor is reduced sufficiently to pass freely through the upper quill and upper cutter bushing and has a section 360 accurately ground to a close sliding fit in the lower cutter bushing 350. The end 361 of the arbor is somewhat smaller than the section 360 and is accurately ground to fit the bore of the lower quill 334. The lower end of the arbor is chamfered as shown at 362.

The cutters must be removed periodically for grinding or replacement or the substitution of different cutters for different materials and operations, and the above construction provides a quick, easy means of so doing. In initially installing a cutter, the tool is placed between the bearings with the key 337 on the lower quill fitting within the grooves 355 and 356 in the lower cutting bushing and cutter and the bushings approximately aligned with the quills. The arbor is then inserted through the upper quill and cutter with the key 359 in the keyway 333. If the keyway 354 in the upper cutter bushing is not aligned with the keyway in the quill, the cutter may be rotated relative to the arbor until the key drops also into this keyway, when the arbor may be pushed down into the lower quill until the head 357 engages the top face of the upper quill. The chamfered end 362 of the arbor will aid in locating the bore of the lower quill. Obviously all that is necessary to remove the cutter is to withdraw the arbor.

It will be recalled that the cutter carriage tracks 22 are positioned so that their upper surfaces are in the horizontal plane of the work axis. The cutter is so positioned on the carriage 285 that it extends an equal distance above and below the upper surface of the tracks 22 as may best be seen in Figure 3. Positioning the cutter equally above and below the plane of the tracks 22 has been found to be highly important in imparting rigidity to the machine and reducing vibration in cutting.

The cutter is driven by a high speed electric motor 363 mounted within the walls of the carriage and is attached to mounting pads on the side walls 289 close to the rear wall 287. The motor shaft is vertical and has a V-grooved pulley 364 on its upper end connected with the cutter pulley 329 by flexible V belts 365. These belts are preferably provided with flexible steel cores to prevent stretch and whip from the centrifugal action of high speed operation.

The cutter heads 26 and 27, it will be noted, are substantially massive and heavy but their frictionless support on their ways provides for free movement with only slight effort. The carriage is normally urged inwardly, or toward the work by a weight 366, best seen in Figures 3 and 29, which is carried on one end of a chain 367. This chain passes over an idle sprocket 368, pivotally carried on a stud 369 attached to the trough side wall 18 near the outwardly overhanging end of the cutter stand, and has its opposite end attached to the free end of a rearwardly extending rigid arm 370 bolted to the rear wall 287 of the cutter carriage.

In order to hold the cutter carriages in their outward positions, with the cutters away from the work, for operations already referred to and which will be additionally described, latches, best seen in Figures 3 and 4, are provided to engage the carriages when they are moved to fully extended positions and which are releasable by the operator from the operator's side of the machine.

The latch for the left hand carriage, or that on the operator's side of the machine, consists of a dog 371 pivoted near one end to the outer vertical face of the rear right hand track 22. (It will be noted that this rail carries only the vertical, supporting rollers.) The longer end of the dog 371 is urged upwardly by a compression spring 372, positioned between it and the track supporting rail 21, and is provided near its end with a shoulder 373. The shorter arm of the dog 371 is provided with a stop 374 which engages the upper surface of the rail 21 to limit the upward movement of the shouldered end of the dog. As seen in Figure 4, when the carriage is moved backwardly the rear roller block 294 rides over the dog and when moved sufficiently for the vertical web 375 to engage the shoulder 373, the dog latches the carriage in this position. The latch may be released by depressing the shouldered end of the dog and for this purpose a finger engaging pin 376 is provided.

The latch for the opposite or right hand carriage is illustrated in Figure 3 and consists of a spring loaded plunger 377 provided with a knurled head 378 and carried in a vertical slide 379 attached to the rear plate 15 of the left hand cutter stand 12. The plunger 377 is adapted, when the right hand carriage is moved fully outwardly, to engage a peripheral groove 380 in a head member 381 secured to one end of a push rod 382. This rod extends transversely of the machine, passing through aligned apertures provided therefor in the cutter stands and main bed and its opposite end is adapted to engage a depending bracket 383 carried by the right hand cutter carriage. When it is desired to latch the right hand cutter away from the work the rod 382 is pushed inwardly. Its free end, engaging the bracket 383, moves the carriage outwardly as shown by dot-dash lines in Figure 3. When the carriage has been thus moved fully outward, the end of the plunger 377 rides over the tapered inner end 384 of the head member 381 and drops into the groove 380, preventing return of the carriage until the plunger is lifted out of the notch by the operator. A collar 385 is provided on the push rod 382 to engage the inner surface of the plate 15 and limit outward movement of the rod.

The cutter carriages are urged inwardly on their ways or tracks by the weights 366. Their inner movement, however, is limited and controlled by the model or blade pattern P and a follower roll 386 carried by each carriage and following the contour of the pattern as it moves transversely to the path of movement of the cutter carriages. In this way the cutters are fed and the blade blank is automatically shaped in accordance with the shape of the model.

It may be stated here that the weights employed are sufficient to urge the cutters into the blank to cut to their full intended depth without riding up on the work and the model is sufficiently rigid not to deflect under the pressure of the follower rolls. For large output, this model preferably is made of cast iron or steel somewhat wider and thicker than the blade to be reproduced therefrom, the difference in size between the model and finished blade being taken care of by a difference in the diameters of the follower rolls and cutter. This is shown in Figure 3. Hard wood and aluminum models or patterns are satisfactory and are preferable for use in reproducing a small number of blades in which instance cast iron and steel models or patterns would be too expensive.

The machine of the present invention may be used for reproducing master or pattern blades. For instance, a wooden pattern or model was made and from this an aluminum blade was carved for use as a model or pattern. In carving such blades they may be made of identical or nearly identical size of the pattern used for their carving. This can be effected by an adjustment of the machine as will appear more fully hereinafter.

In machining the blade from its blank, preferably it is roughed out first by one or more roughing cuts and then finished by one or more finishing cuts. For governing the depth of cut made, the follower rolls are mounted on cross slides and fed laterally with respect to the cutter by the operator of the machine. The follower roll, its mounting and cross slides, are shown in Figures 3 and 19 and in more detail in Figures 27 and 28.

The roll 386 is a cylinder having a smooth and perfectly cylindrical outer surface and has fitted in each end a centrally bored end disc 387. The bore of each end disc is stepped and fitted with a ball bearing 388, the outer races of which are pressed into the bores and the inner races are closely fitted over opposite ends of an arbor 389. The arbor 389 is positioned vertically, that is, parallel with the cutter axis, and held by upper and lower horizontal ears 390 and 391 projecting forwardly from a cross slide designated generally as 392. The upper end of the arbor is fitted into a central bore of a cylindrical, flanged bushing 393 which in turn is fitted into an aperture in the ear 390 and held therein by cap screws 394. The lower end of the arbor is somewhat enlarged to provide a shoulder 395 and fits within an aperture in the lower ear 391 in axial alignment with the bushing 393. A spacing sleeve 396 surrounds the arbor between the inner races of the bearings 388 and the follower roll is fixed against end play on the arbor by a nut 397 screwed up on the upper end of the arbor against the bushing 393 which draws the inner bearing races together between the shoulder 395 and the bushing.

The follower slide 392 moves horizontally on a stand designated generally as 398 and which is provided with a lower saddle piece 399 bolted to a cross strip 400 secured to the upper edge of the front plate 286 and to the forward portion of the upper edges of the side plates 288 and 289 of the cutter carriage. This saddle bridges the cutter belts 365 and supports a vertical plate 401 laterally displaced somewhat from the cutter axis on the tailstock side thereof and extends parallel with the path of movement of the cutter carriage. The plate 401 is braced on the saddle by triangular web pieces 402 between one vertical face of the plate and the saddle. The opposite face of the plate 401 has formed thereon a horizontal dovetail way 403 having a longitudinal groove 404 between and parallel with the angular side faces.

The follower slide 392 is provided on its inner face with a horizontal, dovetail groove 405 into which the dovetail way 403 fits with a gib 406 provided between adjacent angular faces of the way and groove, if desired, as shown in Figure 19. Movement of the slide on the way 403 is brought about by a feed screw 407 rotatably secured in an apron piece 408 fastened to the rear edge of the plate 401. The feed screw 407 extends into the longitudinal groove 404 and engages a nut 409 secured to the cross slide 392. The feed screw is rotated by a hand wheel 410 and is held against axial movement in the apron 408 by a collar engaging one face of the apron and the hub of the hand wheel engaging the other. Outward movement of the slide 392 is limited by an abutment piece 411, at the forward end of the slide, which engages the forward end of the way when the slide is fully retracted, and forward movement is limited by a stop which consists of a bolt 412 secured to the rear portion of the slide and extending through an aperture in the apron 408, the head of the bolt engaging the apron when the slide is moved inwardly.

In order that both slides may be operated from the operator's side of the machine the feed screw of the right hand slide, or that on the side of the machine away from the operator, is provided additionally with a sprocket wheel 413 (Figure 3) which is connected by a chain 414 with a similar sprocket 415 carried on one end of a cross shaft 416, extending above the cross slides to the left hand or operator's side of the machine, and which is provided on its free end with a hand wheel 417. The shaft 416 is journalled in bearings 418 and 419 attached respectively to the apron piece 408 on the right and left hand roller stands. The shaft is fixed against longitudinal movement with respect to the bearing 418 by a collar 420 and is freely slidable in the bearing 419. It will be noted that the shaft is sufficiently long to permit full outward movement of both cutter heads.

Chip disposal

The cutters 28 and 29 preferably are right and left hand and revolve in opposite directions to throw the chips removed from the work in the shaping operation generally outwardly and toward the tailstock of the machine. The means for collecting and disposing of these chips are best illustrated in Figures 3, 19 and 29.

As seen in Figures 3 and 19, the side walls 288 and 289 of the cutter carriage extend substantially to the bottom of the trough 19 in the cutter stand with the lower portion of their forward edges cut back at an angle so that the forward portion of the cutter carriage may override the table 7 when the carriage moves inwardly. These angular edges of the side plates are connected by an angularly disposed plate 421 extending from the bottom edge of the carriage front plate 286 to a bottom plate 422 which is attached to the bottom edges of the side plates 288 and 289. The bottom plate 422 lies parallel with the bottom plate 17 of the trough 19, and is spaced just slightly thereabove, a gasket 423 of felt or other suitable material being interposed between it and the bottom plate of the trough if desired. It has been found that with a clearance of .016" the air leak is negligible and no gasket is necessary.

Extending downwardly from the top plate 400 of the carriage, parallel with the front plate 283 and spaced rearwardly from the front plate, is a partition wall 424 whose opposite vertical edges are joined to the side plates 288 and 289. Somewhat above the angular bottom wall 421, this partition wall 424 bends rearwardly and downwardly, substantially parallel with the angular wall 421, then rearwardly parallel with the bottom plate 422, under the motor 363, and then downwardly to connect with the bottom plate 422. This construction forms a duct 425, extending from the front wall 286 of the cutter carriage to the bottom plate 422. An entrance to the duct 425 is provided by an aperture 426 in the front plate, directly behind the cutter, and an exit in the form of an aperture 427 in the bottom plate 422, adjacent the downturned end of the wall 424.

This discharge aperture 427 of the duct 425 registers with an aperture 428, cut through the gasket 423 and the trough wall 17. It will be noted from reference to Figure 29 that the aperture 428 is the same width as the aperture 427 but has sufficient length to provide for open registration with the aperture 427 during full operative movement of the cutter carriage.

Joined to the lower surface of the bottom trough plates 17 of each of the cutter stands 12 and 13 and surrounding the discharge apertures 428 is the flanged upper end of a pair of down spouts 429 and 430 whose lower ends are joined to, and communicate with, a chip discharge duct 431. This discharge duct extends from a closed end 432, immediately behind the rear wall 15 of the left-hand cutter stand 12, through the rear wall 16, the side plates 2 and 3 of the bed 1 and the right hand cutter stand 13 as best seen in Figure 3. The duct 431 is shown broken off at this point but it is adapted to extend to a convenient point for chip disposal and communicate with the intake side of a suction fan.

With the left hand cutter rotating counterclockwise and the right hand cutter rotating clockwise (as viewed from above) chips will be thrown tangentially away from the cutters, generally toward the tailstock end of the machine, as indicated by the arrow in Figure 29. In order to deflect these chips into the ducts 425, a baffle plate 433 is provided on the tailstock side of each of the cutters in the path of the chips. This baffle plate extends from within the duct opening 426 in the carriage front plate 286, forwardly to as close as practicable to the work, and has its forward end curved toward the cutter. The baffle is spaced sufficiently away from the cutter to permit free movement of chips between the baffle and cutter.

In machining a blade, the cut is made on the blade blank to as near the tip as possible before reversing the table travel, that is, until just before the cutter would touch the tailstock center. To permit this, the baffle plate 433 is pivotally mounted on one end of a pair of parallel arms 434 and 435 which are pivoted at their opposite ends to an angular bracket 436 secured to the front plate 286 and extending through the opening 426 into the duct 425. The forward arm 434 has an extension 437, on the opposite side of its bracket pivot, which is connected by a tension spring 438 to the rear extremity of the bracket 436. The arm 434 moves in a slot 439 in the bracket, the forward edge of this slot serving as a stop for forward movement of the arm and limiting the amount of movement of the baffle 433 toward the work. Normally the spring 438 maintains the baffle in its forwardly extended position with the curved end close to the work. However, when the table approaches the tailstock end of its travel, this curved end of the baffle will ride over the tailstock, its pivotal mounting permitting it to be moved rearwardly against the tension of the spring 438 as indicated by dotdash lines in Figure 29.

The suction fan above referred to, connected to the chip duct 431, creates a suction in this duct, drawing air through the front openings 426 and downwardly through the ducts 425 and down spouts 429. The chips thrown off the cutters and deflected by the baffles 433 will be drawn through the ducts 425, through the registering apertures 427 and 428 in the carriages and their supporting stands and thence through the duct 431 where they are screened out of the air stream in the usual manner.

In addition to deflecting the chips into the disposal ducts, the baffles 433 serve also as a guard for one side of the cutter. A guard for the opposite side of the cutter may be provided in the form of a plate 440 extending forwardly to adjacent the work from a block 441 secured to the front plate 286. This guard plate may curve around, close to the cutter. In order to avoid unnecessary confusion in the drawings, the baffles 433 and cutter guards 440 have been omitted from the drawings except in Figures 19 and 29.

*Operation*

It is thought that the function and operation of the several parts of the machine will be evident from the foregoing description. A brief description of a typical machining operation will be given, however, describing, by way of example, the shaping of a laminated wooden propeller blade.

The blank, from which this wooden blade is formed, is usually made by bonding together several relatively thin strips of wood (maple or other suitable wood) having a width somewhat in excess of the finished width of the blade and of different lengths, the longest strips being the center laminations and the shortest at the shank end of the blank so that the blank tapers from the shank to the tip. The tip end of the blank is twisted relative to the shank end to give a correct twist to the blank which is fixed therein as the bonding material sets. The blank thus formed is a laminated piece, rectangular in plan, slightly longer and wider than the blade to be formed, stepped in longitudinal cross section from the shank end to the tip on opposite surfaces and having a longitudinal twist.

The next operation is to saw this laminated piece roughly to the plan form of the blade, after which it is centered in a lathe and the shank turned to size and shaped to fit the socket of the hub in which the blade is to be used. If a metallic anchor is to be provided, for later mounting the blade in a hub, this is affixed into the shank end of the blade at this stage. The tip end of the blank is likewise turned down to correct size and taper if a female tailstock center such as shown in Figure 17 is to be used in the shaper.

Assuming that the table 7 has been run to its loading position at the right hand end of the bed as above set forth, the correct pattern P, for the blade to be formed, is then set up between its chuck 98 and its tailstock center 199. An index plate 157 suitable for the initial roughing cuts, that is, one with the notches 218 spaced rather far apart to speed the roughing operation, is attached and the hydraulic pump adjusted to give the desired table speed. The shank end of the blade blank is then fixed in the chuck 103 and the tailstock center moved up by means of the hand wheel 192 to engage the tip end of the blank. It is to be noted that the blank is not only aligned longitudinally with the pattern but it is also aligned laterally therewith, that is, the blank and pattern assume the same relative angular pitch in the machine. It will be recalled that the axes of the follower rolls 386 are displaced somewhat from the axes of the cutters to give access to the cutter arbors. The chucks 98 and 103, it will be noted, are arranged so that the pattern and work are correspondingly displaced so that the follower and cutter will engage the same relative axial points on the pattern and blank.

The starting switch button 244 is then pressed, and with the reversing lever 42 in position for table travel to the left, the table is moved until the rise 73 of the cam plate 70 disengages the stem of the valve 62 permitting this valve to crack and supply hydraulic fluid to the right-hand end of the cylinder 31. The table then moves slowly the length of the flat 72 of the cam 70 during which travel the follower rolls 386 will ride over the converging faces 211 of the cam plate 209 and permit the weights 366 to move the cutter heads 26 and 27 inwardly until the cutters engage the blank, the position of the follower rolls relative to the cutters having been first adjusted by the hand wheels 410 and 417 to give the depth of cut desired. As soon as the cam plate 70 rides off of the stem of the valve 62 the table travels at its full regulated speed to the left and a longitudinal cut is made by the cutters 28 and 29 on opposite sides of the blank following the configuration of the surface of the pattern which engages the surface of the follower rolls.

When the table approaches the end of the left hand stroke, the cam 67 partially closes the valve 63 to increase the back pressure in the left end of the cylinder 31 and the movement of the table is slowed down. At the same time the dog 230 closes the starting switch 277 for the indexing motor 149 and the blank and model are rotated about their axes until the dog 220 drops into the next indexing notch to stop the indexing motor. During this time the reversing dog 46 rocks the pilot valve lever 42 to operate the reversing valve 38 and change the direction of flow to the hydraulic cylinder. This reverses the table travel and the second cut is made. Here also the table movement starts slowly and gradually increases speed as the inclined surface 68 of the cam 67 rides off of the valve 63. The reversing dog 48 has, in the meantime, been lowered to engage the lug 44 of the reversing lever 42 so, when the table reaches the end of the right hand stroke, and is gradually slowed down by the inclined face 71 of the cam 70 partially closing the valve 62, the dog 48 reverses the fluid feed to the hydraulic cylinder 31 to again move the table to the left. The blade and pattern are again indexed, this time started by the dog 229 closing the indexing motor starting switch 227 which will be stopped when the indexing plate has rotated the distance of one notch.

The above cyclic operation is repeated until the blank has been rotated through a full 180°, that is, when a cut has been made completely around the blank by the opposed cutters. This first cut will principally remove the angular corners from the blank. The follower rolls are then backed off still further with respect to the cutters and the above operations are repeated through another full 180° rotation of the work. The roughing operation is continued until the blank has assumed the shape of the blade, but slightly oversize, when the machine is stopped by pressing the stop button 245 with the table at the end of a stroke to prepare for finishing cuts to bring the blade down to size. The rough indexing which may be, for example, 10° or 15° for each work stroke, forms the blade roughly to shape but leaves a series of flats extending the length of the blade. In the finishing cuts these flats will be reduced in width so that a substantially continuous curve will be produced.

For the finishing operation, the roughing indexing plate is replaced by one in which the indexing notches are fairly close together, for instance, one or two degrees apart. Preferably for the finishing cuts the table speed is also reduced by reducing the volumetric flow of fluid from the hydraulic pump. The follower rolls are adjusted to give a light cut and the machine is then restarted and cuts are made around the blade until it is reduced to size.

The shank end of a propeller blade is cylindrical, this shape gradually merging into the curvature of the leading and trailing edges, the camber of the upper, or forward, surface and the flat rear surface of the blade. The blade also has a twist from the shank to the tip. In other words, the angle of the chord of the blade, with respect to the plane of rotation of the propeller decreases from the shank to the tip of the blade. The indexed cuts made on the blade will not leave the rear face perfectly flat, and to machine this twisted flat face the following additional cut is made.

After the indexed finishing cuts, and without changing the follower roll feed, the automatic indexing drive is disconnected by dropping the worm 129 out of mesh with the worm gear 118 through manipulation of the lever 154. This leaves the work and pattern spindles 85 and 91 freely rotatable but coupled together. The cutter adjacent the cambered face of the blade is then moved away from the work by moving its carriage to its latched out position as described above. When the work is then fed wth respect to the opposite or engaged cutter, it will be rotated in accordance with the twist of the pattern by the pressure of the engaged follower roll on the flat face of the pattern and the engaged cutter will produce a corresponding flat face on the work.

It may be desirable at times to index the work manually, for instance, to start a cut at a particular point about the blade axis. To index manually, the small gears 144 and 145 connecting the worm shaft 130 with its automatic drive, are brought out of mesh by moving the handle 153 toward the operator. The worm drive 129— 118 may then be operated by the hand wheel 143.

Although the rotational speed of the cutters is sufficient to operate satisfactorily for a work feed in both directions, it may be desirable for some operations to make the cuts during only one direction of the table travel. This may be easily accomplished by simply swinging one of the switch dogs 229 or 230 out of the path of the indexing starting switch button 228 and, as a consequence, the work will be indexed only at one end of the table stroke.

When the finishing cuts have been made, the table is run to its loading position by raising the reversing dog 48 out of the path of the reversing lever 42, the tailstock spindle 175 is moved back and the blade removed from its chuck. The tip end is then removed and the tip finished off by conventional means and the whole blade lightly hand sanded. The surface of the blade, as machined, is substantially finished; the light sanding does not materially change the size and shape of the blade but merely removes the minute ridges on the curved surfaces left by the last finishing cut.

While there has been shown and described a preferred apparatus and preferred procedural and operational steps, the apparatus and the steps of manufacturing propeller blades disclosed are for the purpose of illustrating the principles involved in the inventive concept and many changes may be made, by those skilled in the art, in the order of the steps and the design and arrangement of the several parts, without departing from the spirit of the invention or from the scope of the appended claims.

I claim:

1. In a machine for shaping aircraft propeller blades from work blanks in accordance with the contour of a master model of the blade, an elongated bed, longitudinal ways thereon, a table slidably mounted on said ways, a stock at opposite ends of the table, means carried by each stock for supporting one end of the blank and model in vertical spaced relation and in longitudinal alignment with said ways, transverse ways on the bed and lying in a horizontal plane coinciding with the longitudinal axis of the blank, a tool support movably mounted on the transverse ways, a cylindrical cutter mounted for rotation about a vertical axis on the tool support and adapted to engage the blank, said cutter extending equidistant above and below said plane of the transverse ways, a cylindrical follower mounted on the tool support for free rotation about an axis parallel with the cutter axis and adapted to engage the model, a motor carried by the tool support for driving the cutter, and means normally urging the tool support toward the blank and model.

2. In a machine for shaping aircraft propeller blades from work blanks in accordance with the contour of a master model of the blade, an elongated bed, longitudinal ways thereon, a table slidably mounted on said ways, a stock at opposite ends of the table, means carried by each stock for supporting one end of the blank and model in vertical spaced relation and in longitudinal alignment with said ways, transverse ways on the bed and lying in a horizontal plane coinciding with the longitudinal axis of the blank, a tool support movably mounted on the transverse ways, a cylindrical cutter mounted for rotation about a vertical axis on the tool support, said cutter extending equidistant above and below said plane of the transverse ways and adapted to engage the blank, a cylindrical follower mounted on the tool support for free rotation about an axis parallel with the cutter axis and adapted to engage the model, a motor carried by the tool support for driving the cutter, and weight means normally urging the tool support toward the blank and model.

3. In a machine for shaping aircraft propeller blades from work blanks in accordance with the contour of a master model of the blade, an elongated bed, longitudinal ways thereon, a table slidably mounted on said ways, a stock at opposite ends of the table, means carried by each stock for supporting one end of the blank and model in vertical spaced relation and in longitudinal alignment with said ways, transverse ways on the bed and lying in a horizontal plane coinciding with the longitudinal axis of the blank, a tool support movably mounted on the transverse ways, a cylindrical cutter mounted for rotation about a vertical axis on the tool support and adapted to engage the blank, said cutter extending equidistant above and below said plane of the transverse ways, a cylindrical follower mounted on the tool support for free rotation about an axis parallel with the cutter axis and adapted to engage the model, a motor carried by the tool support for driving the cutter, means normally urging the tool support toward the blank and model, and adjustment means for displacing the follower laterally toward or away from the model with respect to the tool for varying the depth of cut made thereby.

4. In a machine for shaping aircraft propeller blades, a longitudinally movable work support and a pair of opposed transversely movable tool carriages, means on the support for holding a blank and a model of the blade in juxtaposed relationship parallel to the path of movement of the support, a cutting tool on each carriage and adapted to respectively engage opposite sides of said blank, independently operating means urging said carriages inwardly toward the blank and model, a model follower mounted on each carriage and adapted to engage said model to limit inward movement of the carriage, means for reciprocating the work support, and independently operable latch means for selectively holding either or both of said carriages in a position outwardly away from said blank and model.

5. In a machine for shaping aircraft propeller blades, a longitudinally movable work support, a pair of opposed transversely movable tool carriages, means on the work support for holding parallel with the path of movement of the support a work blank and a master model of the blade in vertically spaced parallel relation thereto, a rotary cutting tool vertically journaled on each carriage and respectively adapted to engage opposite sides of the blank, means independently urging the carriages inwardly toward the blank and model, a cylindrical model follower journaled for rotation about a vertical axis on each tool carriage and adapted respectively to engage opposite sides of the model to limit inward movement of said tool carriages, means for reciprocating the work support, and independently operable latch means for selectively holding either or both of said tool carriages in a position outwardly away from said model and blank.

6. In a machine for shaping aircraft propeller blades, said machine including a longitudinally movable work support and a transversely movable tool carriage on opposite sides of the support, means on the work support for holding a work blank and a master model of the blade in juxtaposed relationship parallel with the path of movement of the support, a rotary cutting tool journaled on each tool carriage for rotation about an axis perpendicular to the longitudinal axis of the blank and adapted to engage the blank, means urging the carriage inwardly in rectilinear movement toward the blank and model, a rotary model follower mounted on each tool carriage for rotation about an axis parallel with the tool axis and adapted to engage the model for limiting inward movement of said tool, means for imparting reciprocating strokes to the work support, means for retarding movement of the work support as said support approaches the ends of said strokes, and automatic means responsive to movement of the work support adjacent the end of said strokes for indexing the blank and model during the interval of retarded movement of the work support.

7. A method of shaping propeller blades and like objects having non-flat surfaces and at least one flat surface comprising simultaneously feeding a blank to be shaped and a model of the object in longitudinal reciprocating strokes with respect to a cutting tool, moving the cutting tool transversely with respect to the blank to engage the same in accordance with the longitudinal configuration of said model, simultaneously rotating the model and blank through small increments about their longitudinal axes, between strokes, locking the model and blank against rotation and maintaining the same locked during strokes for cutting non-flat surfaces of the blank, and releasing the model and blank for free rotation during cutting of the flat surface.

8. In the profiling of propeller blades and other objects having a flat surface in which a model and a blank of the blade to be profiled are simultaneously moved longitudinally relative to a cutter during cutting strokes and in which the model and blank are rotated between cutting strokes and locked against rotation during cutting strokes, the step of releasing the blank and model for free rotation during the stroke for cutting the flat surface.

9. A method of shaping propeller blades and like objects having non-flat surfaces and at least one flat surface twisted with respect to the longitudinal axis thereof comprising simultaneously feeding a blank to be shaped and a model of the object in longitudinal reciprocating strokes with respect to a cutting tool, moving the cutting tool transversely with respect to the blank to engage the same in accordance with the longitudinal configuration of said model, coupling the model and blank for simultaneous rotation about their longitudinal axes, simultaneously rotating the model and blank through small increments about their longitudinal axes between strokes, locking the model and blank against rotation and maintaining the same locked during strokes for cutting non-flat surfaces of the blank, releasing the model and blank for free but coupled rotation during cutting of said twisted flat surface and rotating the blank during the cutting stroke by the camming action of a cutter-guiding-model-follower causing the model to rotate during the stroke.

10. In a machine for shaping airplane propellers and the like, means for supporting and moving a work blank in longitudinally reciprocating feed strokes, an elongated rotary cutting tool, means for mounting the tool for rotation about an axis perpendicular to the axis of the work blank, the said tool being positioned with respect to the blank to extend substantially equi-distant above and below a horizontal plane passing through the axis of said blank, means exerting a force substantially in said plane for urging the tool inwardly toward said blank to engage the same and means for limiting said inward movement including a master model of the blade positioned parallel with the blank and a follower positioned parallel with the axis of said tool and engageable with the blank, a carriage for the tool and follower, and guide means positioned in the said plane and supporting said carriage.

11. In a machine for shaping airplane propellers and the like, means for supporting and moving a work blank in longitudinally reciprocating feed strokes, an elongated rotary cutting tool, means for mounting the tool for rotation about an axis perpendicular to the axis of the work blank, the said tool being positioned with respect to the blank to extend substantially equi-distant above and below a horizontal plane passing through the axis of said blank, means exerting a force substantially in said plane for urging the tool inwardly toward said blank to engage the same, means for limiting said inward movement including a master model of the blade positioned parallel with the blank and a follower positioned parallel with the axis of said tool and engageable with the blank, and a motor for driving said cutting tool, the motor being positioned with respect to said horizontal plane that its mass is substantially equally distributed above and below said plane, a carriage for the tool follower and motor, and guide means positioned in the said plane and supporting said carriage.

12. In a machine for shaping aircraft propeller blades from work blanks in accordance with the contour of a master model of the blade, an elongated bed, longitudinal ways thereon, a table slidably mounted on said ways, a stock at opposite ends of the table, means carried by each stock for supporting one end of the blank and model in vertical spaced relation and in longitudinal alignment with said ways, transverse ways on the bed and lying in a horizontal plane coinciding with the longitudinal axis of the blank, a tool support movably mounted on the transverse ways, a cylindrical cutter mounted for rotation about a vertical axis on the tool support and adapted to engage the blank, said cutter extending equidistant above and below said plane of the transverse ways, a cylindrical follower mounted on the tool support for free rotation about an axis parallel with the cutter axis and adapted to engage the model, a motor carried by the tool support for driving the cutter, the mass of said motor being distributed substantially equally above and below the plane of said transverse ways, and means normally urging the tool support toward the blank and model.

13. In a machine for shaping aircraft propeller blades, said machine including a longitudinally movable work support and a transversely movable tool carriage, said support having means for holding a work blank and a master model of the blade in juxtaposed relationship parallel with the path of movement of the support, and said machine having means for reciprocating the support in feed strokes along said path, an elongated cylindrical cutting tool journalled on said carriage equidistantly above and below a plane containing the longitudinal axis of said blank for rotation about an axis perpendicular to said plane, said tool adapted to engage the blank during said strokes to make longitudinal cuts thereon, a cylindrical follower journalled for rotation on the carriage axially parallel with said tool and adapted to engage the model, and means engaging said carriage substantially in said plane and exerting a force on the carriage in said plane for urging the same toward said blank and model.

14. In a machine for shaping aircraft propeller blades, said machine including a longitudinally movable work support and a transversely movable tool carriage, said support having means for holding a work blank and a master model of the blade in juxtaposed relationship parallel with the path of movement of the support, and said machine having means for reciprocating the support in feed strokes along said path, an elongated cylindrical cutting tool journalled on said carriage equidistantly above and below a plane containing the longitudinal axis of said blank for rotation about an axis perpendicular to said plane, said tool adapted to engage the blank during said strokes to make longitudinal cuts thereon, a cylindrical follower journalled for rotation on the carriage axially parallel with said tool and adapted to engage the model, means engaging said carriage substantially in said plane for urging the same toward said blank and model, and means for indexing the blank and model about the axes thereof, and means for selectively rendering the index means inoperative to permit rotation of the blank and model independently of the indexing means.

15. In a machine for shaping aircraft propeller blades, said machine including a longitudinally movable work support and a transversely movable tool carriage, said support having means for holding a work blank and a master model of the blade in juxtaposed relationship parallel with the path of movement of the support, and said machine having means for reciprocating the support in feed strokes along said path, an elongated cylindrical cutting tool journalled on said carriage equidistantly above and below a plane containing the longitudinal axis of said blank for rotation about an axis perpendicular to said plane, said tool adapted to engage the blank during said strokes to make longitudinal cuts thereon, a cylindrical follower journalled for rotation on the carriage axially parallel with said tool and adapted to engage the model, means engaging said carriage substantially in said plane and exerting a force on the carriage in said plane for urging the same toward said blank and model, and adjustment means for displacing the follower laterally with respect to the tool toward or away from the model for varying the depths of cut of said tool.

16. In a machine for shaping aircraft propeller blades, said machine including a longitudinally movable work support and a transversely movable tool carriage, said support having means for holding a work blank and a master model of the blade in juxtaposed relationship parallel with the path of movement of the support, and said machine having means for reciprocating the support in feed strokes along said path, an elongated cylindrical cutting tool journalled on said carriage equidistantly above and below a plane containing the longitudinal axis of said blank for rotation about an axis perpendicular to said plane, said tool adapted to engage the blank during said strokes to make longitudinal cuts thereon, a cylindrical follower journalled for rotation on the carriage axially parallel with said tool and adapted to engage the model, means engaging said carriage substantially in said plane and exerting a force on the carriage in said plane for urging the same toward said blank and model, and motor means on the carriage for driving the cutting tool.

17. In a machine for shaping aircraft propeller blades, said machine including a longitudinally movable work support and a pair of transversely movable tool carriages disposed on opposite sides of said support, said support having means for holding a work blank and a master model of the blade in juxtaposed relationship parallel with the path of movement of the support, and said machine having means for reciprocating the support in feed strokes along said path, an elongated cylindrical cutting tool journalled on each of said carriages equidistantly above and below a plane containing the longitudinal axis of said blank for rotation about an axis perpendicular to said plane, said tools adapted to engage opposite sides of said blank during said strokes to make longitudinal cuts thereon, a cylindrical follower journalled for rotation on each of said carriages axially parallel with the tool thereon and adapted to engage opposite sides of the model, and independent means engaging each carriage substantially in said plane and exerting force thereon in said plane for independently urging the carriages toward said blank and said model.

18. In a machine for shaping aircraft propeller blades, said machine including a longitudinally movable work support and a pair of transversely movable tool carriages disposed on opposite sides of said support, said support having means for holding a work blank and a master model of the blade in juxtaposed relationship parallel with the path of movement of the support, and said machine having means for reciprocating the support in feed strokes along said path, an elongated cylindrical cutting tool journalled on each of said carriages equidistantly above and below a plane containing the longitudinal axis of said blank for rotation about an axis perpendicular to said plane, said tools adapted to engage opposite sides of said blank during said strokes to make longitudinal cuts thereon, a cylindrical follower journalled for rotation on each of said carriages axially parallel with the tool thereon and adapted to engage opposite sides of the model, independent means engaging each carriage substantially in said plane and exerting force thereon in said plane for independently urging the carriages toward said blank and said model, and means for rotating simultaneously the blank model through increments about their respective axes.

19. In a machine for shaping aircraft propeller blades, said machine having means for supporting a work blank and a master model of the blade in juxtaposed parallel relationship, a tool carriage mounted for rectilinear movement transversely to the axes of said model and blank, an elongated cutting tool mounted on said carriage substantially perpendicular to and extending substantially equidistantly on opposite sides of a plane containing the blank axes, yielding means engaging the carriage substantially in said plane and exerting a force thereon parallel with said plane for urging the carriage toward the blank and model, a model follower mounted on the carriage and engageable with the model for determining the extent of movement of the tool toward said blank, and means for simultaneously moving the model and blank with respect to said carriage.

20. In a machine for shaping aircraft propeller blades, said machine having means for supporting a work blank and a master model of the blade in juxtaposed parallel relationship, ways lying in a plane containing the axis of said blank, a carriage mounted on said ways for movement toward and away from the blank and model, a cutting tool mounted on said carriage perpendicular to and extending equidistantly on opposite sides of said plane, yielding means engaging the carriage substantially in said plane and urging the carriage toward the blank and model, a model follower mounted on the carriage and adapted to engage the model for determining the extent of tool movement toward the blank, and means for simultaneously moving the blank and model with respect to said carriage.

CLAUDE M. SKINNER.

REFERENCES CITED

The following references are of record in the file of this patent:

UNITED STATES PATENTS

| Number | Name | Date |
|---|---|---|
| 307,628 | Case | Nov. 4, 1884 |
| 390,884 | Merklin | Oct. 9, 1888 |
| 562,268 | Ashton | June 16, 1896 |
| 1,098,038 | Hayden | May 26, 1914 |
| 1,302,594 | Roessler | May 6, 1919 |
| 1,325,724 | Keller | Dec. 23, 1919 |
| 1,375,326 | Schwarz | Apr. 19, 1921 |
| 1,421,116 | Woodard et al. | June 27, 1922 |
| 1,840,051 | Nenninger | Jan. 5, 1932 |
| 1,893,443 | Pearce | Jan. 3, 1933 |
| 1,972,633 | Smith | Sept. 4, 1934 |
| 1,978,389 | Sassen | Oct. 23, 1934 |
| 2,005,508 | Shaw | June 18, 1935 |
| 2,059,505 | Wright | Nov. 3, 1936 |
| 2,089,099 | Roehm | Aug. 3, 1937 |
| 2,178,441 | Swanson | Oct. 31, 1939 |
| 2,204,696 | Ratie | June 18, 1940 |
| 2,206,942 | Cook | July 9, 1940 |
| 2,211,562 | Ford | Aug. 13, 1940 |
| 2,267,177 | Twyman | Dec. 23, 1941 |
| 2,329,756 | Granberg | Sept. 21, 1943 |
| 2,335,625 | Wilson | Nov. 30, 1943 |
| 2,416,749 | Grey | Mar. 4, 1947 |

FOREIGN PATENTS

| Number | Country | Date |
|---|---|---|
| 96,611 | Germany | Apr. 15, 1898 |
| 432,078 | Great Britain | July 19, 1935 |
| 488,000 | Great Britain | June 29, 1938 |
| 506,927 | France | June 7, 1920 |
| 559,291 | Germany | Sept. 17, 1932 |